(12) United States Patent
Yoguchi et al.

(10) Patent No.: US 11,978,480 B2
(45) Date of Patent: May 7, 2024

(54) OPTICAL DISC DRIVE AND ELECTRONIC EQUIPMENT

(71) Applicant: Sony Interactive Entertainment Inc., Tokyo (JP)

(72) Inventors: Aki Yoguchi, Tokyo (JP); Keigo Sato, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/913,331

(22) PCT Filed: Mar. 18, 2021

(86) PCT No.: PCT/JP2021/011179
§ 371 (c)(1),
(2) Date: Sep. 21, 2022

(87) PCT Pub. No.: WO2021/200232
PCT Pub. Date: Oct. 7, 2021

(65) Prior Publication Data
US 2023/0154495 A1 May 18, 2023

(30) Foreign Application Priority Data
Mar. 30, 2020 (JP) .................................. 2020-061438

(51) Int. Cl.
*G11B 17/04* (2006.01)
(52) U.S. Cl.
CPC ................................ *G11B 17/0404* (2013.01)
(58) Field of Classification Search
None
See application file for complete search history.

(56) References Cited

U.S. PATENT DOCUMENTS 5,719,844 A * 2/1998 Abe .................... G11B 17/0515
720/625
5,828,641 A * 10/1998 Abe ...................... G11B 17/051
720/645

(Continued)

FOREIGN PATENT DOCUMENTS

JP     08138298 A  *  5/1996  ......... G11B 17/0404
JP     1092073 A      4/1998
(Continued)

OTHER PUBLICATIONS

International Search Report for related PCT Application No. PCT/JP2021/012745, 6 pages, dated Jun. 22, 2021.

(Continued)

*Primary Examiner* — William J Klimowicz
(74) *Attorney, Agent, or Firm* — Matthew B. Dernier, Esq.

(57) ABSTRACT

There is provided an optical disc drive that can maintain contact between an optical disc and a conveying roller, while allowing the number of components to be reduced. A conveying roller includes a right roller that is rotatable around an axis and a left roller that is rotatable around an axis. The right roller portion and the left roller portion are arranged in a lateral direction. One of a right end portion of the right roller portion and a left end portion of the left roller portion is movable in an up-down direction relative to the other of the right end portion of the right roller portion and the left end portion of the left roller portion, with a relative position between the axis and the axis unchanged.

7 Claims, 17 Drawing Sheets

(56) References Cited

U.S. PATENT DOCUMENTS

| | | | | |
|---|---|---|---|---|
| 7,665,099 B2* | 2/2010 | Peng | ............... | G11B 17/18 |
| | | | | 720/625 |
| 8,397,250 B2* | 3/2013 | Ogawa | ............... | G11B 17/0404 |
| | | | | 720/624 |
| 8,949,869 B1 | 2/2015 | Yoguchi | | |
| 9,202,508 B2 | 12/2015 | Eto | | |
| 2003/0099182 A1* | 5/2003 | Maeda | ............... | G11B 17/0515 |
| 2005/0091676 A1* | 4/2005 | Kasama | ............... | G11B 17/0404 |
| | | | | 720/625 |
| 2006/0015884 A1* | 1/2006 | Kuo | ............... | G11B 17/0404 |
| | | | | 720/600 |
| 2006/0059499 A1* | 3/2006 | Huang | ............... | G11B 17/0404 |
| | | | | 720/624 |
| 2011/0273827 A1 | 11/2011 | Kasai | | |
| 2015/0026704 A1* | 1/2015 | Eto | ............... | G11B 17/0515 |
| | | | | 720/604 |
| 2015/0026705 A1 | 1/2015 | Yoguchi | | |

FOREIGN PATENT DOCUMENTS

| | | | | |
|---|---|---|---|---|
| JP | 1092073 A | 7/1998 | | |
| JP | 2004103192 A | 4/2004 | | |
| JP | 2006048837 A | 2/2006 | | |
| JP | 3123523 U | 7/2006 | | |
| JP | 2006209886 A | 8/2006 | | |
| JP | 3892021 B1 * | 3/2007 | ......... | G11B 17/0404 |
| JP | 2008226338 A * | 9/2008 | ......... | G11B 17/0288 |
| JP | 2012181887 A | 9/2012 | | |
| JP | 2013114722 A | 6/2013 | | |
| JP | 2013131266 A | 7/2013 | | |
| JP | 2014130668 A | 7/2014 | | |
| JP | 2015022779 A | 2/2015 | | |
| JP | 2015022780 A | 2/2015 | | |
| JP | 2017068888 A | 4/2017 | | |
| JP | 2017208153 A | 11/2017 | | |
| JP | 2018055751 A | 4/2018 | | |
| JP | 2018179150 A | 11/2018 | | |
| WO | WO-2007029368 A1 * | 3/2007 | ......... | G11B 17/0404 |
| WO | 2010087143 A1 | 8/2010 | | |
| WO | 2013105573 A1 | 7/2013 | | |
| WO | 2017163279 A1 | 9/2017 | | |

OTHER PUBLICATIONS

International Search Report for related PCT Application No. PCT/JP2021/011178, 5 pages, dated Jun. 15, 2021.

International Search Report for corresponding PCT Application No. PCT/JP2021/011179, 5 pages, dated Jun. 15, 2021.

International Search Report for related PCT Application No. PCT/JP2021/012744, 5 pages, dated Jun. 29, 2021.

International Search Report for related PCT Application No. PCT/JP2021/012746, 6 pages, dated Jun. 29, 2021.

International Search Report for corresponding PCT Application No. PCT/JP2021/012746, 6 pages, dated Jun. 15, 2021. (re-submitted to correct the publication date).

International Preliminary Report on Patentability and Written Opinion for corresponding PCT Application No. PCT/JP2021/011179, 6 pages, dated Oct. 13, 2022.

* cited by examiner

OPTICAL DISC DRIVE AND ELECTRONIC EQUIPMENT

TECHNICAL FIELD

The present invention relates to an optical disc drive and electronic equipment.

BACKGROUND ART

PTL 1 and PTL 2 listed below each disclose an optical disc drive that can be mounted in electronic equipment such as a game machine, a personal computer, or audio-visual (AV) equipment. The optical disc drive includes a conveying roller that contacts an optical disc inserted through an insertion port formed in a front surface of the optical disc drive and that conveys the optical disc to the position of a spindle motor and a chucking pulley that magnetically fixes, to the spindle motor, the optical disc having reached the position of the spindle motor.

CITATION LIST

Patent Literature

[PTL 1]
JP 2015-022780A
[PTL 2]
JP 2015-022779A

SUMMARY

Technical Problem

When one or both ends of the conveying roller are movable in an up-down direction, the conveying roller can maintain contact with an optical disc inserted through the insertion port. However, even in a case where contact is maintained between the conveying roller and the optical disc as described above, the optical disc drive desirably includes as few components as possible in order to suppress an increased manufacturing cost of the optical disc drive.

An object of the present invention is to provide an optical disc drive that can maintain contact between the optical disc and the conveying roller, while allowing the number of components to be reduced.

Solution to Problem

An optical disc drive according to the present invention includes a conveying roller including a right roller portion configured to be rotatable around a first axis and a left roller portion configured to be rotatable around a second axis, the right roller portion and the left roller portion being arranged in a lateral direction, and a conveying roller driving mechanism configured to rotate the conveying roller. A first end portion corresponding to one of a right end portion of the right roller portion and a left end portion of the left roller portion is configured to be movable in an up-down direction relative to a second end portion corresponding to the other of the right end portion of the right roller portion and the left end portion of the left roller portion, with a relative position between the first axis and the second axis unchanged. According to the present invention, contact between an optical disc and the conveying roller can be maintained, while the number of components of the optical disc drive can be reduced.

DESCRIPTION OF EMBODIMENT

Figure 1:
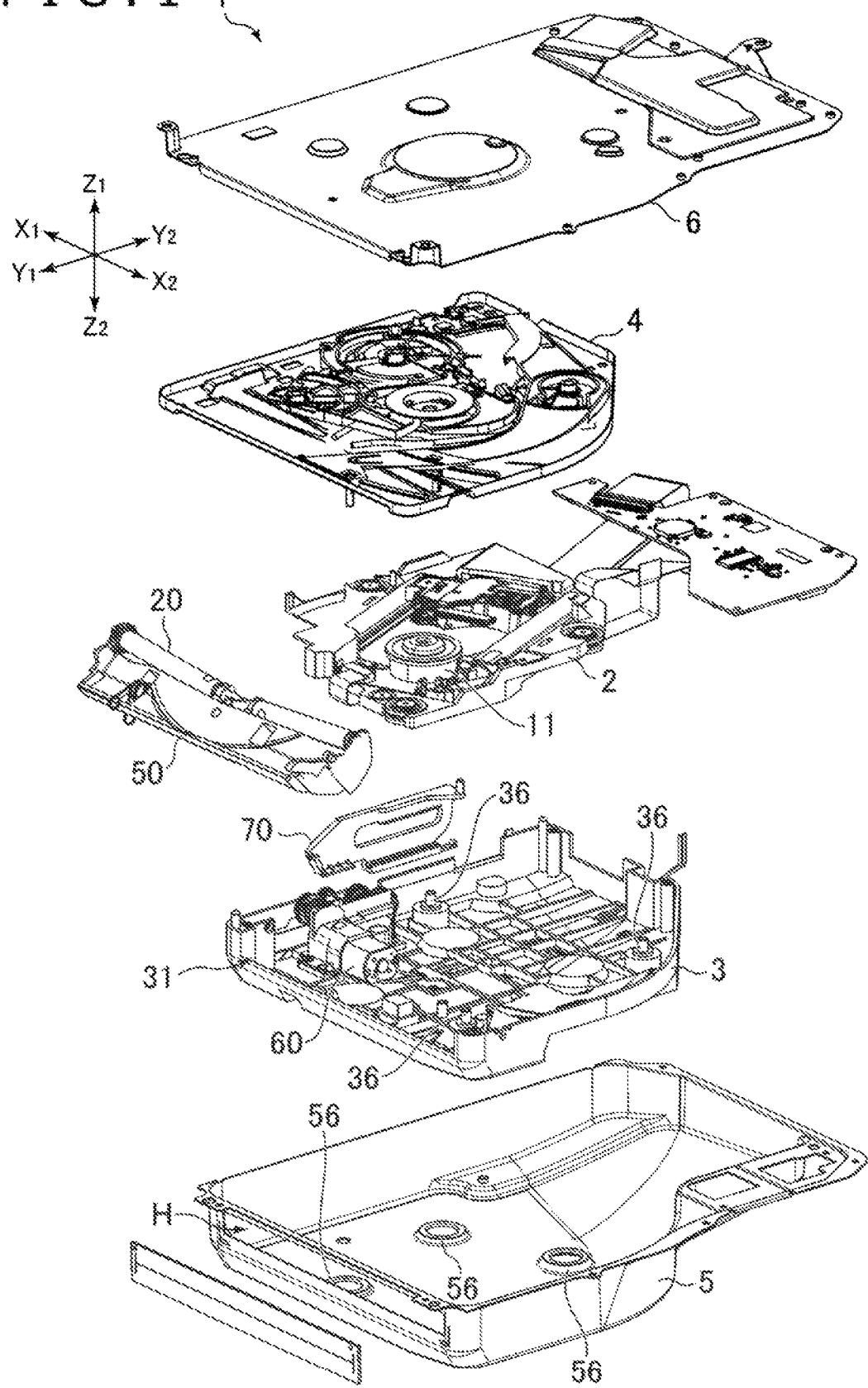
FIG. 1 is an exploded perspective view of an optical disc drive 1 according to an embodiment of the present invention.

An embodiment of the present invention will be described below with reference to the drawings. FIG. 1 is an exploded perspective view of an optical disc drive 1 according to the embodiment of the present invention. In the description below, X1 and X2 depicted in FIG. 1 denote a left direction and a right direction, Y1 and Y2 denote a forward direction and a backward direction, and Z1 and Z2 denote an upward direction and a downward direction. In the present embodiment, on an axis CB (see FIGS. 10B and 12B) of a spindle motor 11 described below, with an optical disc placed on the spindle motor 11, a direction from the spindle motor 11 toward the optical disc is assumed to be "upward," and the opposite direction is assumed to be "downward." Further, among the directions perpendicular to the axis CB of the spindle motor 11, the direction in which an insertion port is disposed with respect to the position where the spindle motor 11 is disposed is assumed to be "forward," and the opposite direction is assumed to be "backward." In addition, a plane perpendicular to the axis CB of the spindle motor 11 is assumed to be a horizontal plane. Further, in members (components), the uppermost position, the lowermost position, the leftmost position, the rightmost position, the foremost position, and the backmost position are respectively assumed to be an upper end, a lower end, a left end, a right end, a front end, and a back end. In addition, a portion of a member including at least the upper end, the lower end, the left end, the right end, the front end, or the back end of the member is respectively assumed to be an upper end portion, a lower end portion, a left end portion, a right end portion, a front end portion, or a back end portion.

1. Configuration of Optical Disc Drive

The optical disc drive 1 is housed in a cabinet included in electronic equipment such as a game machine, a personal computer, or AV equipment. As depicted in FIG. 1, the optical disc drive 1 includes a base frame 2 (base unit). The base frame 2 is generally shaped like a plate, and an optical disc is placed on the base frame 2. The base frame 2 includes the spindle motor 11 used as a turntable that rotates the optical disc. The spindle motor 11 rotates around an axis CB (see FIGS. 10B and 12B) perpendicular to an upper surface of the base frame 2. Further, the base frame 2 includes a circuit board on which the spindle motor 11 is mounted, an optical pickup (optical element), a motor that moves the optical pickup in a front-back direction, and the like.

Note that the optical disc is, for example, a compact disc (CD), a digital versatile disc (DVD), a Blu-Ray Disc (registered trademark), or the like. The optical disc drive 1 described in the present embodiment corresponds to an optical disc with a diameter of 12 cm.

Further, the optical disc drive 1 includes a bottom frame 3. As depicted in FIG. 1, the bottom frame 3 is shaped like a box, and various members such as the base frame 2 are disposed in the bottom frame 3. In addition, the optical disc drive 1 includes a top frame 4 attached to an upper side of the bottom frame 3. The top frame 4 is generally shaped like a plate and attached to the bottom frame 3 to constitute, together with the bottom frame 3, an inner case that houses the base frame 2, a conveying roller 20, a roller bracket 50, and a loading motor 60 and gears 61a to 61g described below (see FIG. 7). The bottom frame 3 and the top frame 4 may include resin.

Figure 2A:
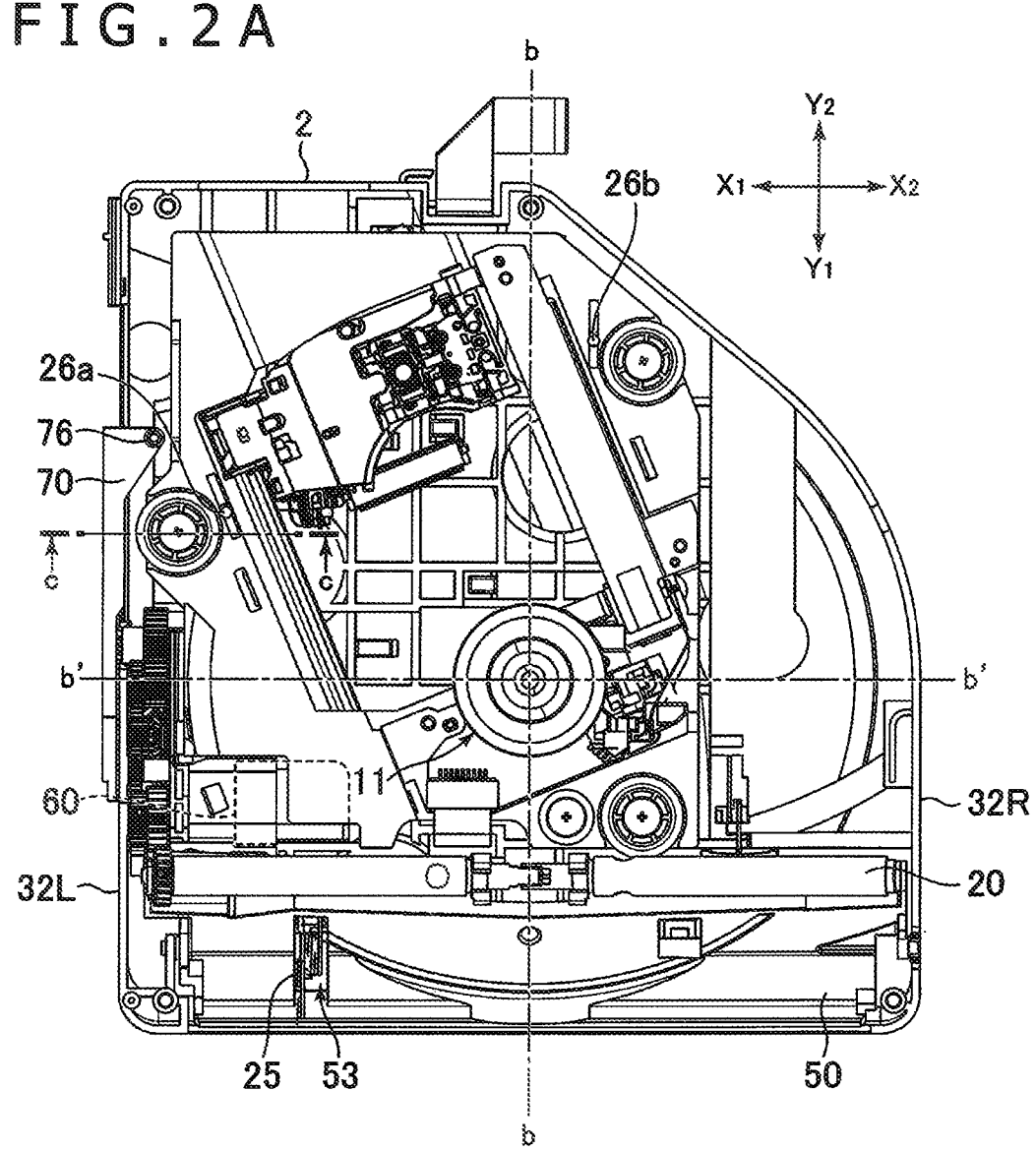
FIG. 2A is a top view of a bottom frame.
Figure 2B:
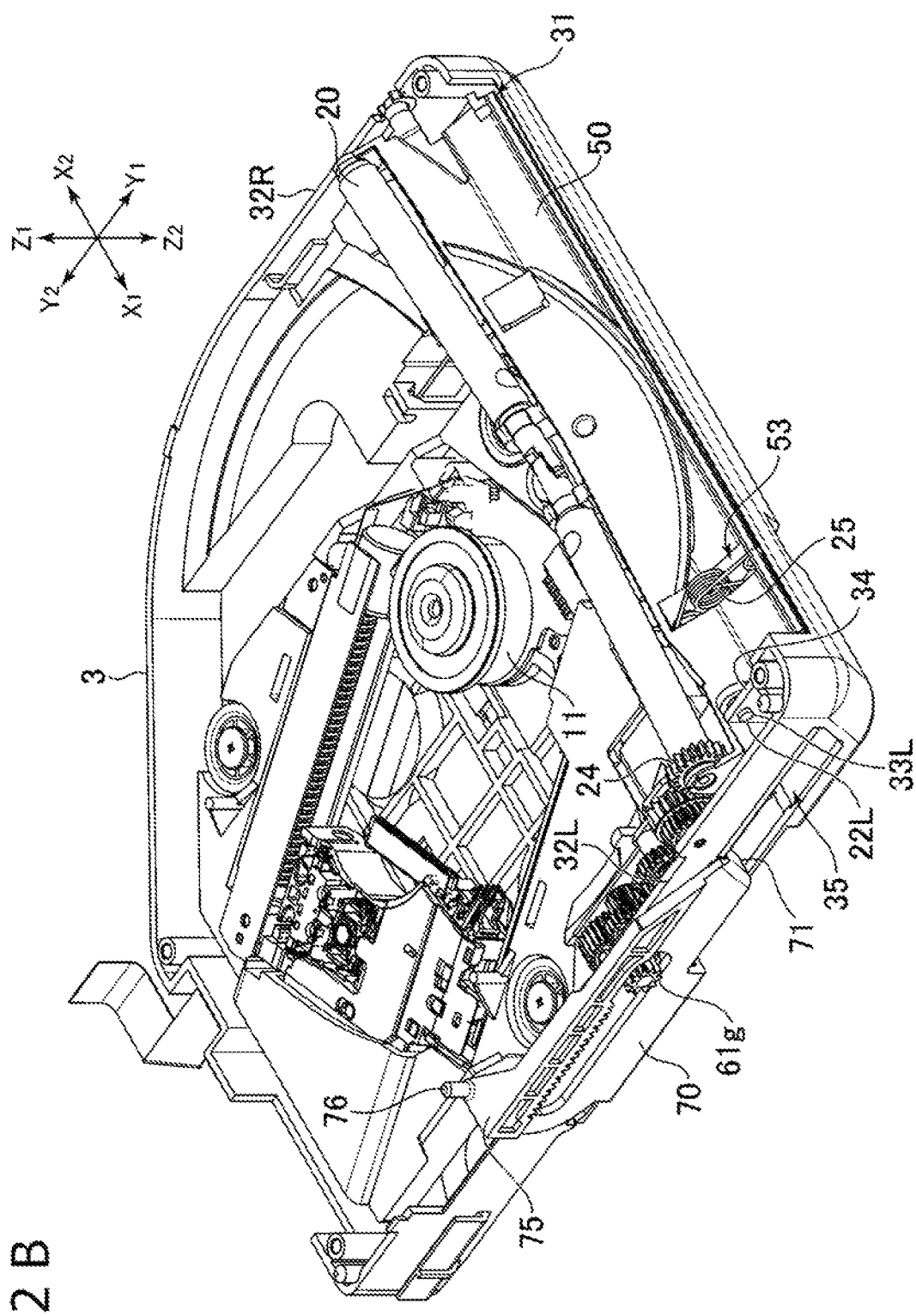
FIG. 2B is a perspective view of the bottom frame.

FIG. 2A is a top view of the bottom frame 3, and FIG. 2B is a perspective view of the bottom frame 3. FIGS. 2A and 2B depict the bottom frame 3 in which various members are disposed. As depicted in FIGS. 2A and 2B, the base frame 2 and the roller bracket 50 to which the conveying roller 20 is attached are disposed inside the bottom frame 3. Further, a slider 70 is disposed outside the bottom frame 3.

The bottom frame 3, shaped like a box, includes a rectangular cutout portion 31 at a front upper edge of the bottom frame 3. The cutout portion 31 and a lower edge of a front end portion of the top frame 4 which is generally shaped like a plate constitute an insertion port into which an optical disc is inserted. The optical disc inserted into the insertion port is placed between the bottom frame 3 and the top frame 4. More specifically, the optical disc is placed between the conveying roller 20 disposed inside the bottom frame 3 and the top frame 4, is conveyed by a conveying mechanism A (such as the conveying roller 20), and thus placed between the base frame 2 disposed inside the bottom frame 3 and the top frame 4.

Figure 3:
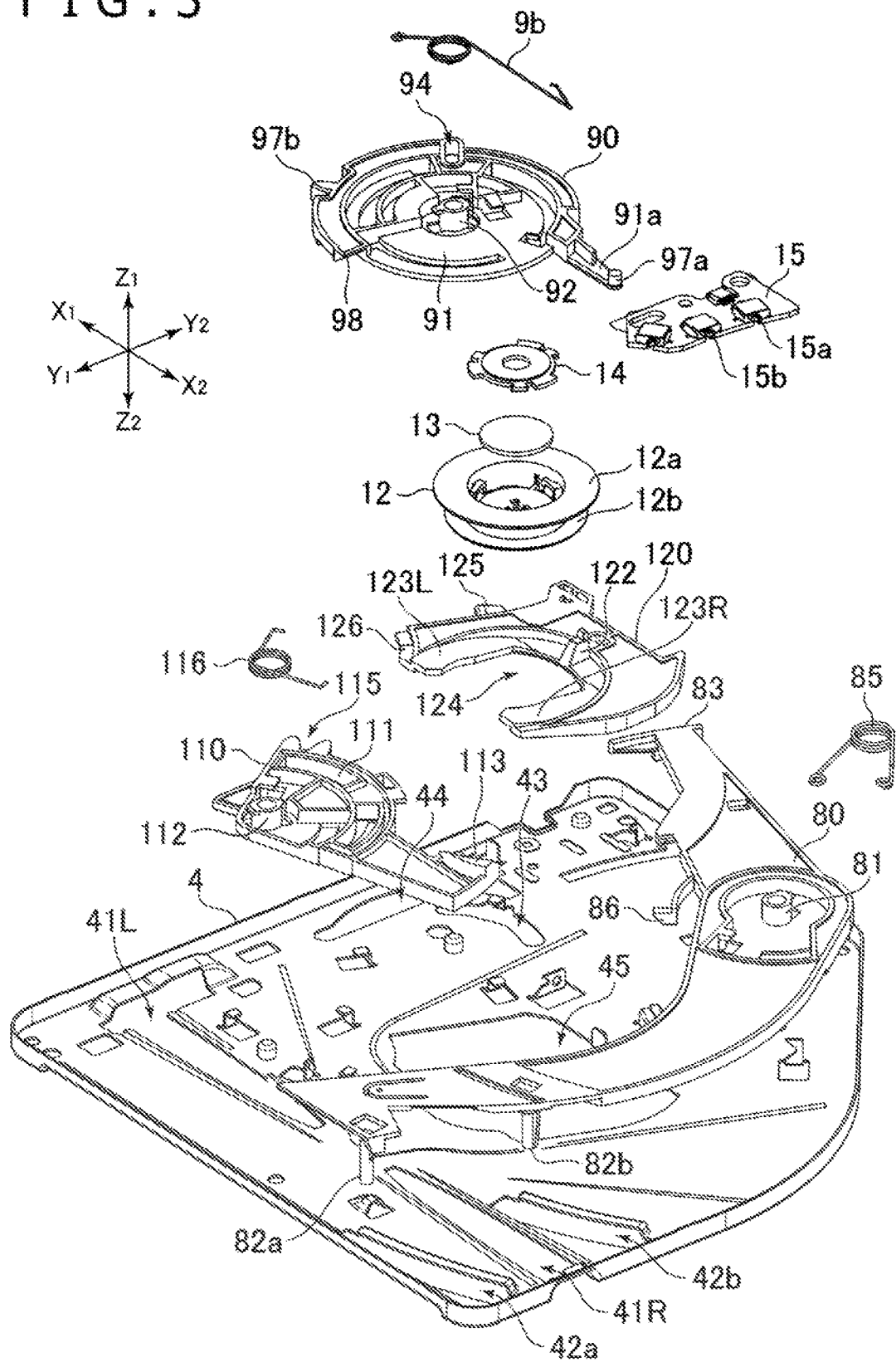
FIG. 3 is an exploded perspective view depicting a top frame and members disposed in the top frame.

FIG. 3 is an exploded perspective view depicting the top frame 4 and members disposed in the top frame 4. As depicted in FIG. 3, a chucking pulley 12, a switch board 15, a switch arm 80, a rotary arm 90, a first check arm 110, a second check arm 120, and a plurality of springs 85, 96, and 116 are disposed in the top frame 4. Each of the members will be described below in detail.

Further, as depicted in FIG. 1, the optical disc drive 1 includes a bottom case 5 and a cover 6 as constituent components of an outer case corresponding to an outermost shell of the optical disc drive 1. The bottom case 5 is shaped like a box, and an inner case including the bottom frame 3 and the top frame 4 is housed inside the bottom case 5. In this manner, the outer case (the bottom case 5 and the cover 6) covers the entire inner case (the bottom frame 3 and the top frame 4), allowing dust to be restrained from entering the inside of the optical disc drive 1 or the inside of the bottom frame 3. Further, the bottom case 5 and the cover 6 may be formed from metal. This allows electromagnetic waves to be restrained from entering the inside of the optical disc drive 1 and from leaking out from the optical disc drive 1.

A rectangular hole portion H is formed in a front surface of the bottom case 5. When the optical disc drive 1 is seen in front view, the hole portion H is overlaid on a cutout portion 31 formed in the bottom frame 3 and constitutes an insertion port for an optical disc together with the cutout portion 31. In other words, the optical disc drive 1 includes the bottom case 5 and the bottom frame 3 corresponding to a member provided with the insertion port.

Further, the optical disc drive 1 includes a conveying mechanism A that conveys the optical disc, a centering mechanism B that aligns the optical disc, a chucking mechanism C that fixes the optical disc, and a vibration suppression mechanism D that suppresses vibration of the optical disc drive 1. The conveying mechanism A is configured to convey, to the position of the spindle motor 11, the optical disc inserted into the insertion port from the outside of the optical disc drive 1 and to convey, to the outside of the insertion port, the optical disc placed on the spindle motor 11. The centering mechanism B is a mechanism for positioning the optical disc such that the central position of the optical disc aligns with the position of the axis CB corresponding to the rotation center of the spindle motor 11 (hereinafter also referred to as a drive position). The chucking mechanism C is a mechanism for fixing the optical disc in the drive position. The vibration suppression mechanism D is a mechanism for restraining vibration that occurs in the base frame 2 while the optical disc is rotating in the drive position from being transmitted to the inner case (the bottom frame 3 and the top frame 4) and the outer case (the bottom case 5 and the cover 6). In the present embodiment, the conveying mechanism A is provided in the bottom frame 3, the centering mechanism B is provided in the base frame 2 and the top frame 4, C is provided in the top frame 4, and the vibration suppression mechanism D is provided in the base frame 2, the bottom frame 3, and the bottom case 5. The conveying mechanism A, the centering mechanism B, the chucking mechanism C, and the vibration suppression mechanism D will be described below.

2. Conveying Mechanism

The conveying mechanism A will be described. The conveying mechanism A includes the conveying roller 20 that conveys, toward the position of the spindle motor 11, the optical disc inserted through the insertion port of the optical disc drive 1. The conveying roller 20 is disposed in contact with the optical disc inserted into the insertion port (space between the cutout portion 31 of the bottom frame 3 and the top frame 4) of the optical disc drive 1. In the present embodiment, the conveying roller 20 is located below a conveying path along which the optical disc passes. Thus, the conveying roller 20 contacts a lower surface of the optical disc and conveys the optical disc in the front-back direction.

The base frame 2 is disposed inside the bottom frame 3, and the spindle motor 11 mounted in the base frame 2 is disposed behind and away from the cutout 31 of the bottom frame 3 constituting the insertion port. Further, inside the bottom frame 3, the conveying roller 20 attached to the roller bracket 50 is disposed in front of the base frame 2.

As depicted in FIG. 2B, the optical disc drive 1 includes a spring 25 configured to bias the conveying roller 20 in a direction (upward in this case) toward the conveying path along which the optical disc passes. The spring 25 is attached to a hole portion 53 formed on a left side of the roller bracket 50 with respect to the center of the roller bracket 50. The spring 25 biases the roller bracket 50 and the conveying roller 20 to place the conveying roller 20 in a conveying position. This brings the conveying roller 20 (a left roller 21L and a right roller 21R described below) into contact with the lower surface of the optical disc.

The conveying mechanism A is actuated by power received from the loading motor 60. While placed in the conveying position in contact with the lower surface of the optical disc, the conveying roller 20 is rotated by power from the loading motor 60 to convey, toward the position of the spindle motor 11, the optical disc inserted through the insertion port (the cutout 31 of the bottom frame 3). The conveying roller 20 can be moved by a conveying roller position manipulation mechanism described below between a conveying position (first roller position) where the conveying roller 20 contacts and conveys the optical disc and a retract position (second roller position) located away from the conveying position. The retract position is a position where the conveying roller 20 is located below and away from the conveying path for the optical disc and does not contact the optical disc.

Figure 4:
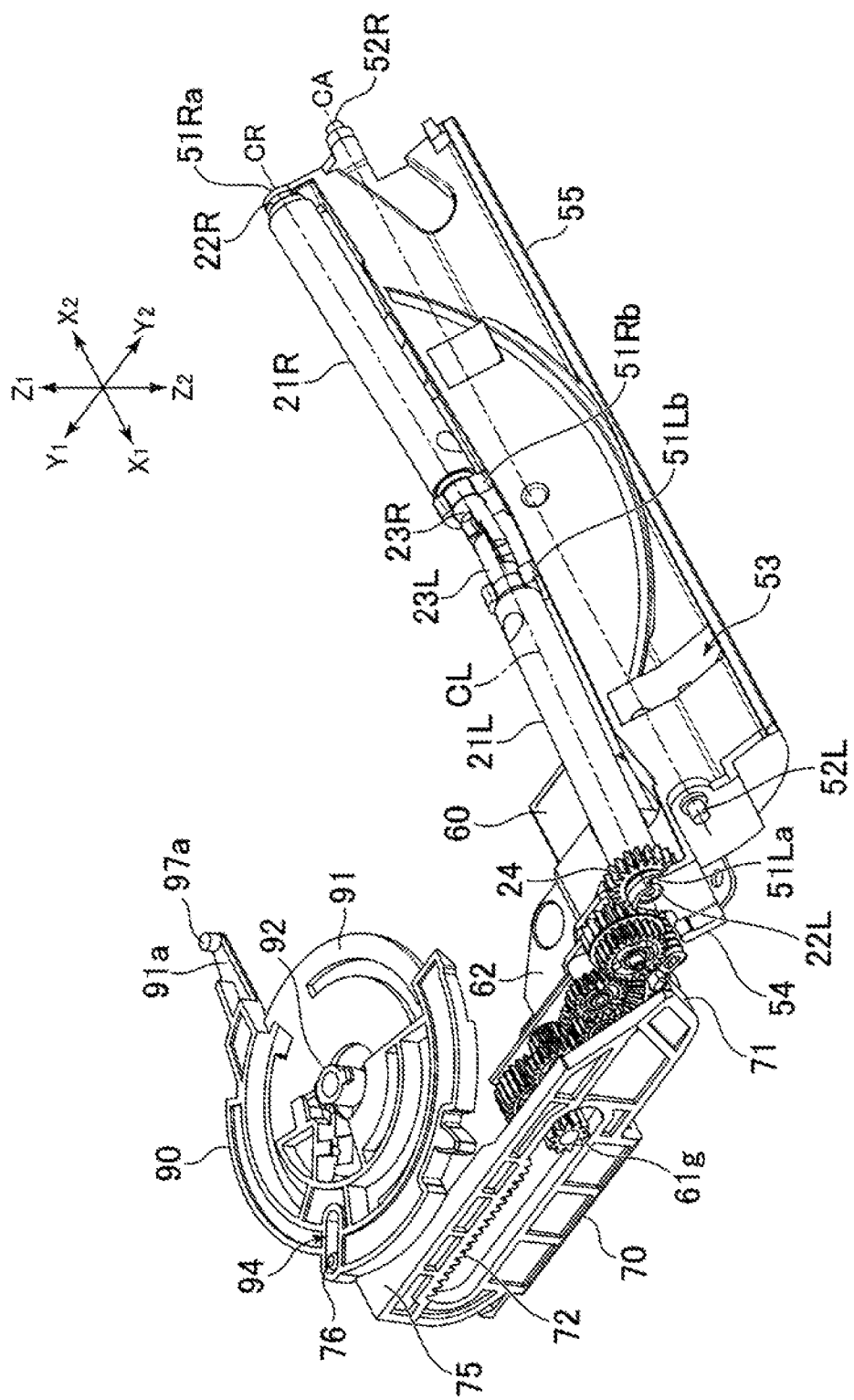
FIG. 4 is a perspective view depicting constituent components of a conveying mechanism.

FIG. 4 is a perspective view depicting constituent components of the conveying mechanism A. As depicted in FIG. 4, the conveying roller 20 includes the left roller 21L (left roller portion) that is rotatable around an axis CL (first axis) and the right roller 21R (right roller portion) that is rotatable around an axis CR (second axis), the left roller 21L and the right roller 21R being arranged in a lateral direction. The left roller 21L and the right roller 21R are cylindrical members separately formed. Thus, the left roller 21L and the right roller 21R, which are separate members as described above, can easily be formed.

The conveying roller 20 is disposed below the top frame 4. As depicted in FIG. 3, the top frame 4 includes openings 41L and 41R at positions respectively corresponding to the left roller 21L and the right roller 21R constituting the conveying roller 20. In a case where the conveying roller 20 is in the conveying position, outer side portions of the left and right rollers 21L and 21R are respectively placed inside the openings 41L and 41R.

As depicted in FIG. 4, the left roller 21L includes a shaft portion 22L at a left end portion and a coupling portion 23L at a right end portion. Similarly, the right roller 21R includes a shaft portion 22R at a right end portion and a coupling portion 23R at a left end portion. The left roller 21L and the right roller 21R are coupled to each other by the coupling portions 23L and 23R. The coupling portion 23L is fixed to the left roller 21L, and a tip of the coupling portion 23L is formed like a frame. Similarly, the coupling portion 23R is fixed to the right roller 21R, and a tip of the coupling portion 23R is formed like a frame. At the central position of the conveying roller 20, the coupling portions 23L and 23R are coupled to each other by the tip of one of the coupling portions 23L and 23R being fitted into the frame of the other. The left and right rollers 21L and 21R may have the same frame shape.

With the coupling portions 23L and 23R connected to each other, a first end portion corresponding to one of the left end portion of the left roller 21L and the right end portion of the right roller 21R can be moved in an up-down direction with respect to a second end portion corresponding to the other end portion, with the relative positions of the axes CL and CR unchanged. In this case, the first end portion can be moved in the up-down direction with respect to the second end portion with the coupling portions 23L and 23R respectively fixed to support portions 51Lb and 51Rb and with the angle between the axes CL and CR unchanged. Thus, when a user inserts an optical disc, even in a case where the optical disc is misaligned in the lateral direction, the left end portion of the left roller 21L or the right end portion of the right roller 21R is moved in the up-down direction with the angle between the rollers maintained. Thus, the left roller 21L and the right roller 21R come into contact with the optical disc at predetermined areas of the optical disc, allowing maintenance of a state in which the optical disc is gripped. Further, for example, compared to a structure in which the left roller 21L and the right roller 21R move independently to change the relative positions of the axes CL and CR, the present embodiment with the relative positions of the axes CL and CR unchanged has a simple structure, enabling the number of components of the optical disc drive 1 to be reduced.

The left roller 21L and the right roller 21R constituting the conveying roller 20 are attached to the single roller bracket 50 and rotatably supported by the roller bracket 50. As described above, the one roller bracket 50 supports the left roller 21L and the right roller 21R, and this configuration enables the number of components of the optical disc drive 1 to be reduced compared to, for example, a configuration in which two brackets respectively support the left roller 21L and the right roller 21R.

Figure 5:
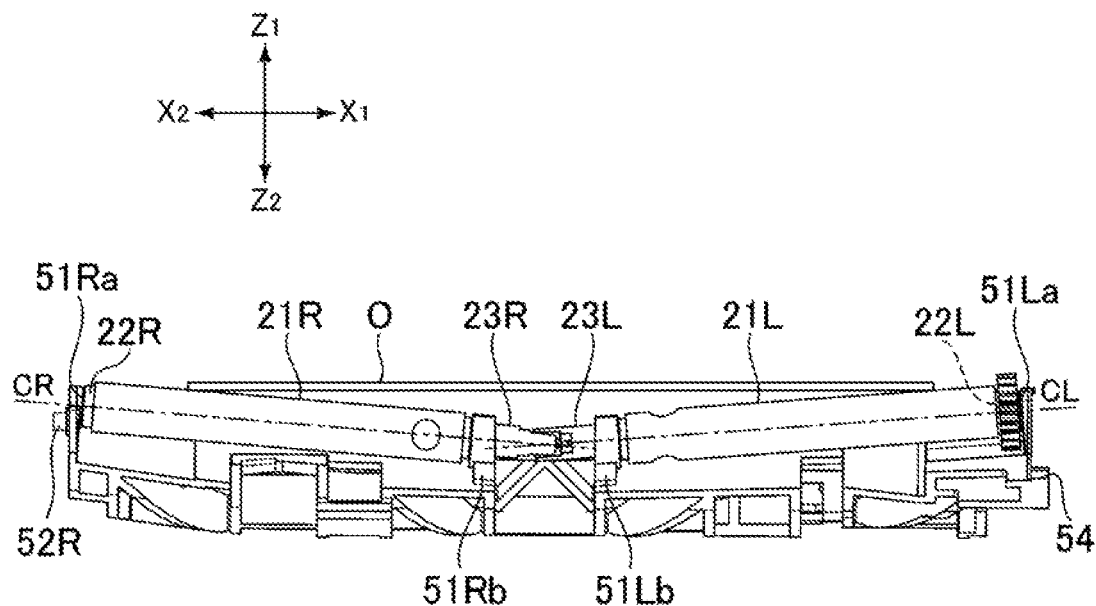
FIG. 5 is a rear view of a conveying roller and a roller bracket.
Figure 8:
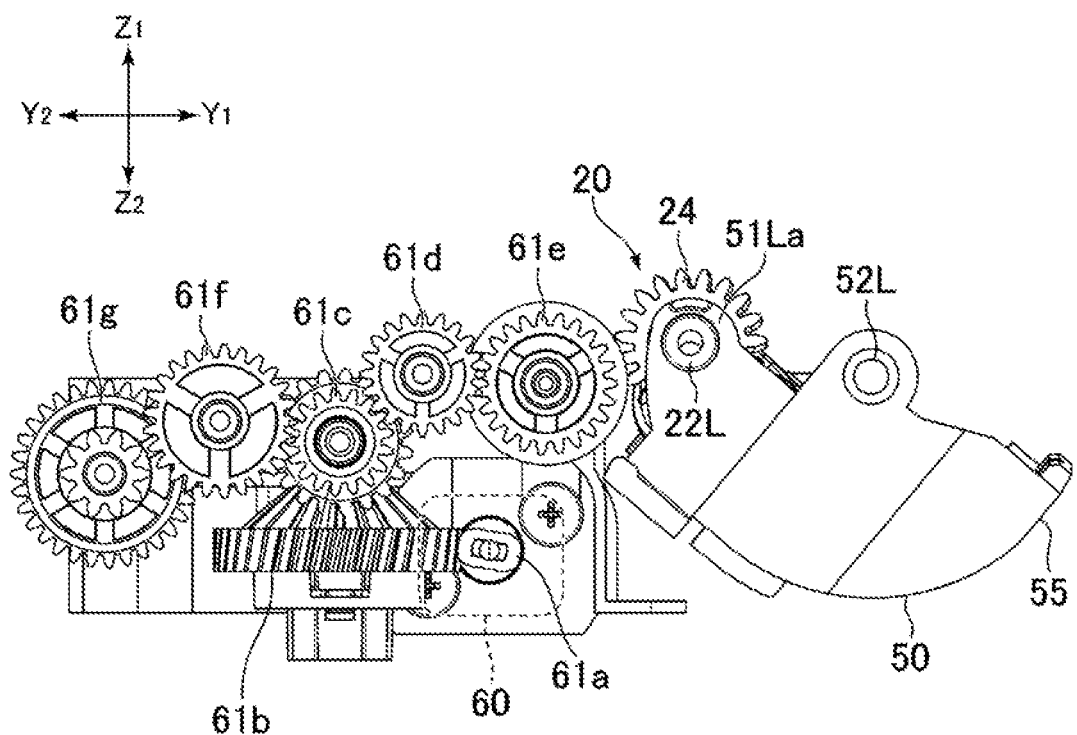
FIG. 8 is a left side view of the gears and the roller bracket.

FIG. 5 is a rear view of the conveying roller 20 and the roller bracket 50. As depicted in FIGS. 4 and 5, the roller bracket 50 includes a support portion 51La that supports the shaft portion 22L of the left roller 21L, the support portion 51Lb that supports the coupling portion 23L of the left roller 21L, a support portion 51Ra that supports the shaft portion 22R of the right roller 21R, and the support portion 51Rb that supports the coupling portion 23R of the right roller 21R. As depicted in FIG. 4 and FIG. 8 described below, the support portion 51La has an annular shape. Further, the support portions 51Lb and 51Rb are shaped like circular arcs that are open upward. The shaft portion 22L and the coupling portions 23L and 23R are fitted inside the support portions 51Lb and 51Rb. Further, the support portion 51Ra is a protrusion fitted into a hole formed at a right end of the shaft portion 22R of the right roller 21R.

The support portions 51Lb and 51Rb that support the coupling portion 23L of the left roller 21L and the coupling portion 23R of the right roller 21R are located below the support portions 51La and 51Ra that support the shaft portion 22L of the left roller 21L and the shaft portion 22R of the right roller 21R. Thus, the axis CL of the left roller 21L and the axis CR of the right roller 21R are inclined with respect to a horizontal plane (a plane perpendicular to the axis CB of the spindle motor 11). As depicted in FIG. 5, an optical disc O shaped like a disc is inserted into the insertion port of the optical disc drive 1 along the horizontal plane and is conveyed to the position of the spindle motor 11. Thus, the axis CL of the left roller 21L and the axis CR of the right roller 21R are inclined with respect to the optical disc O placed on the conveying roller 20.

The axis CL of the left roller 21L is inclined such that the distance between the axis CL and the optical disc O gradually increases from a left end portion of the conveying roller 20 toward a central portion of the conveying roller 20. Similarly, the axis CR of the right roller 21R is inclined such that the distance between the axis CR and the optical disc O gradually increases from a right end portion of the conveying roller 20 toward a central portion of the conveying roller 20. Since the axes CL and CR of the left and right rollers 21L and 21R are inclined as described above, the left and right rollers 21L and 21R can be brought into contact with the optical disc O except for an area of optical disc O in which data is recorded (a circular area with a radius corresponding to a predetermined distance from the center of the optical disc O).

One of a left end portion and a right end portion of the roller bracket 50 can be moved in the up-down direction relative to the other. Thus, one (first end portion) of the left end portion of the left roller 21L and the right end portion of the right roller 21R can be moved in the up-down direction relative to the other end portion (second end portion). In the present embodiment, the shaft portion 22R corresponding to the right end portion of the right roller 21R can be moved in the up-down direction relative to the shaft portion 22L corresponding to the left end portion of the left roller 21L.

The left end portion and the right end portion of the roller bracket 50 are supported by the bottom frame 3. As depicted in FIG. 4, the roller bracket 50 includes a shaft portion 52L at the left end portion and a shaft portion 52R at the right end portion. The roller bracket 50 includes an axis CA along the lateral direction and is rotatable along the axis CA. The shaft portions 52L and 52R are cylindrical protrusions respectively protruding leftward and rightward from the roller bracket 50 and are located on the axis CA of the roller bracket 50 away from each other in the lateral direction. As depicted in FIG. 2B, the shaft portion 52L formed at the left end portion of the roller bracket 50 is fitted into a bearing portion 33L formed in the bottom frame 3. Further, the shaft portion 52R formed at the right end portion of the roller bracket 50 is fitted into a bearing portion 33R formed in the bottom frame 3. As depicted in FIG. 4, the axis CA of the roller bracket 50 is located in front of and away from the conveying roller 20. Thus, when the roller bracket 50 rotates around the axis CA, the conveying roller 20 attached to the roller bracket 50 rotationally moves around the axis CA. This movement allows the conveying roller 20 to move between the conveying position where the conveying roller 20 (the left roller 21L and the right roller 21R) contacts the optical disc and the retract position located below and away from the conveying position.

A supported portion (the shaft portion 52L or the shaft portion 52R) is formed at one of the right end portion and the left end portion of the roller bracket 50, and a support portion (the bearing portion 33L or the bearing portion 33R) supports the supported portion and is formed by the bottom frame 3. The supported portion and the support portion may be formed to permit movement of the supported portion in the up-down direction. Thus, one of the left end portion and the right end portion of the roller bracket 50 can move in the up-down direction with respect to the other, and one (first end portion) of the left end portion of the left roller 21L and the right end portion of the right roller 21R can move in the up-down direction relative to the other end portion (second end portion). In other words, depending on the state of the optical disc inserted, one of the left end portion and the right end portion of the roller bracket 50 is displaced in the up-down direction with respect to the other, thus displacing one (first end portion) of the left end portion of the left roller 21L and the right end portion of the right roller 21R in the up-down direction relative to the other end portion (second end portion). This makes it possible to maintain an appropriate state of connection between the optical disc and the rollers depending on the state of the optical disc.

Figure 6:
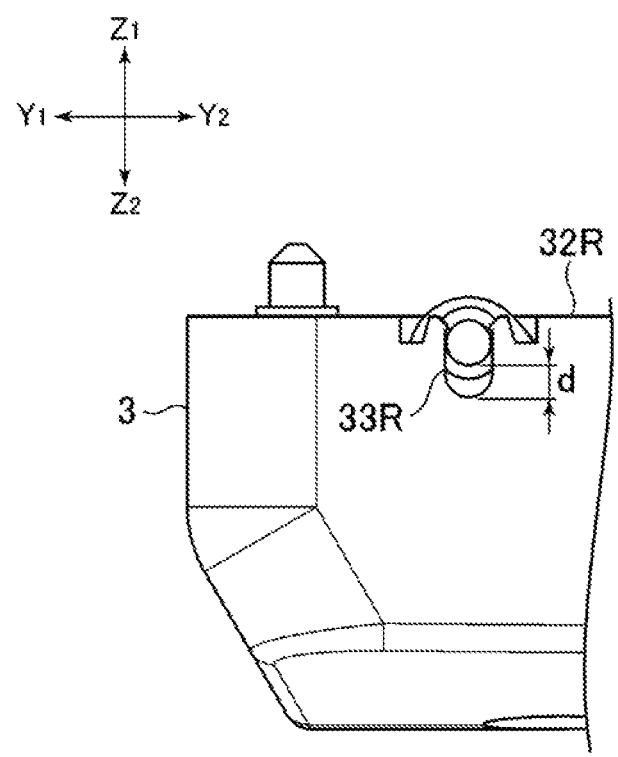
FIG. 6 is a partially enlarged view of a right side surface of the bottom frame.

FIG. 6 is a partially enlarged view of a right side surface of the bottom frame 3. As depicted in FIGS. 2A, 2B, and 6, in the present embodiment, the bottom frame 3 includes a right side wall portion 32R constituting a right end portion (a right frame portion of the box) of the bottom frame 3. In the right side wall portion 32R, the bearing portion 33R is formed. With the roller bracket 50 biased upward by the spring 25, a gap d extending in the up-down direction is formed between the shaft portion 52R of the roller bracket 50 and the bearing portion 33R of the bottom frame 3. The gap d permits, inside the bearing portion 33R, movement of the right end portion (shaft portion 52R) of the roller bracket 50 in the up-down direction. Note that, in FIG. 6, the bearing portion 33R is formed as a cutout but the bearing portion 33R may be a slot that is elongate in the up-down direction.

Further, as depicted in FIG. 2B, the bottom frame 3 includes a left side wall portion 32L constituting a left end portion (a left frame portion of the box) of the bottom frame 3. Further, inside the bottom frame 3, a left inner wall portion 34 shaped like a flat plate is formed in parallel with the left side wall portion 32L. A left bearing portion 33L is formed in the left inner wall portion 34 such that the shaft portion 52L of the roller bracket 50 is fitted in the bearing portion 33L. Inside the bearing portion 33L, movement of the left end portion (shaft portion 52L) of the roller bracket 50 in the up-down direction is restricted.

The conveying mechanism A includes a conveying roller driving mechanism that rotates the conveying roller 20. The roller driving mechanism may be coupled to one (second end portion) of the left end portion of the left roller 21L or the right end portion of the right roller 21R of which movement in the up-down direction is restricted. When the roller driving mechanism is disposed at the second end portion of which movement in the up-down direction is restricted as described above, the roller driving mechanism and the conveying roller can easily be coupled. In the present embodiment, the bearing portion 33L of the bottom frame 3 restricts the movement of the left end portion (shaft portion 52L) of the roller bracket 50 in the up-down direction, thus restricting the movement, in the up-down direction, of the shaft portion 22L corresponding to the left end portion of the left roller 21L. Further, as depicted in FIG. 4, a gear 24 is attached to the shaft portion 22L corresponding to the left end portion of the left roller 21L, and the conveying roller driving mechanism (gear 61e described below) is coupled to the gear 24. A rotational center axis of the gear 24 is located on the axis CL of the left roller 21L. Note that no gear that is coupled to the conveying roller driving mechanism is attached to the shaft portion 22R corresponding to the right end portion (first end portion) of the right roller 21R of which movement in the up-down direction is permitted.

Figure 7:
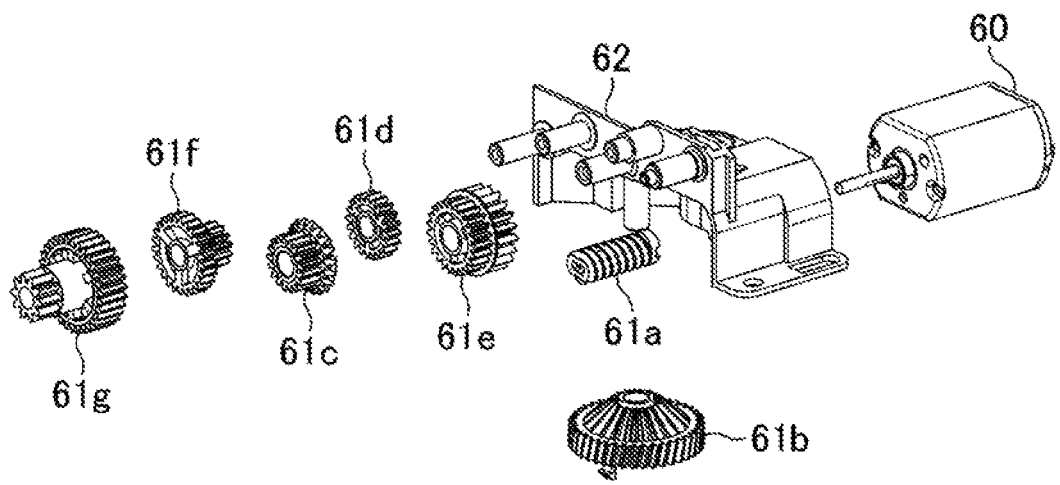
FIG. 7 is an exploded perspective view depicting a loading motor and gears.

FIG. 7 is an exploded perspective view depicting the loading motor 60 and gears 61a to 61g. FIG. 8 is a left side view of the gears 61b to 61g and the roller bracket 50. The gear 61a is a worm gear and is fitted around a rotating shaft of the loading motor 60 and meshed with the gear 61b. The gear 61 configured as a worm gear allows a certain reduction ratio to be achieved with respect to the rotation speed of shaft of the loading motor 60. Further, as depicted in FIG. 8, the gear 61b is meshed with the gears 61a and 61c. The gear 61c is meshed with the gears 61b, 61d, and 61f. The gear 61d is meshed with the gears 61c and 61e. The gear 61e is meshed with the gear 61c and with the gear 24 coupled to the left roller 21L. The gear 61f is meshed with the gears 61c and 61g.

The conveying mechanism A includes a first transmission mechanism that transmits rotation of the loading motor 60 to the conveying roller 20, as a part of the conveying roller driving mechanism that rotates the conveying roller 20. In the present embodiment, the gears 61a to 61e correspond to the first transmission mechanism. In other words, rotation of the loading motor 60 is transmitted to the gear 24 via the first transmission mechanism corresponding to the gears 61a to 61e. The gear 24 then rotates clockwise or counterclockwise to rotate the left roller 21L to which the gear 24 is attached and the right roller 21R coupled to the coupling portion 23L of the left roller 21L via the coupling portion 23R, in the same direction as that in which the gear 24 rotates (clockwise or counterclockwise) at the same speed as that of rotation of the gear 24. As depicted in FIG. 8, at least a part of the loading motor 60 is located behind the gear 61e constituting a front end of the first transmission mechanism. Note that the first transmission mechanism is not limited to the gears and may include belts or the like.

Further, the conveying mechanism A includes the roller bracket 50 and the slider 70 as the conveying roller position manipulation mechanism that moves the position of the conveying roller 20. As depicted in FIG. 2B, the slider 70 is attached to the left end portion (left side wall portion 32L) of the bottom frame 3. The slider 70 functions as the conveying roller operation member moving the conveying roller 20 to the conveying position (first roller position) where the conveying roller 20 contacts the optical disc and to a position (second roller position) that is located away from the conveying position and where the conveying roller 20 is separated from the optical disc.

Figure 9A:
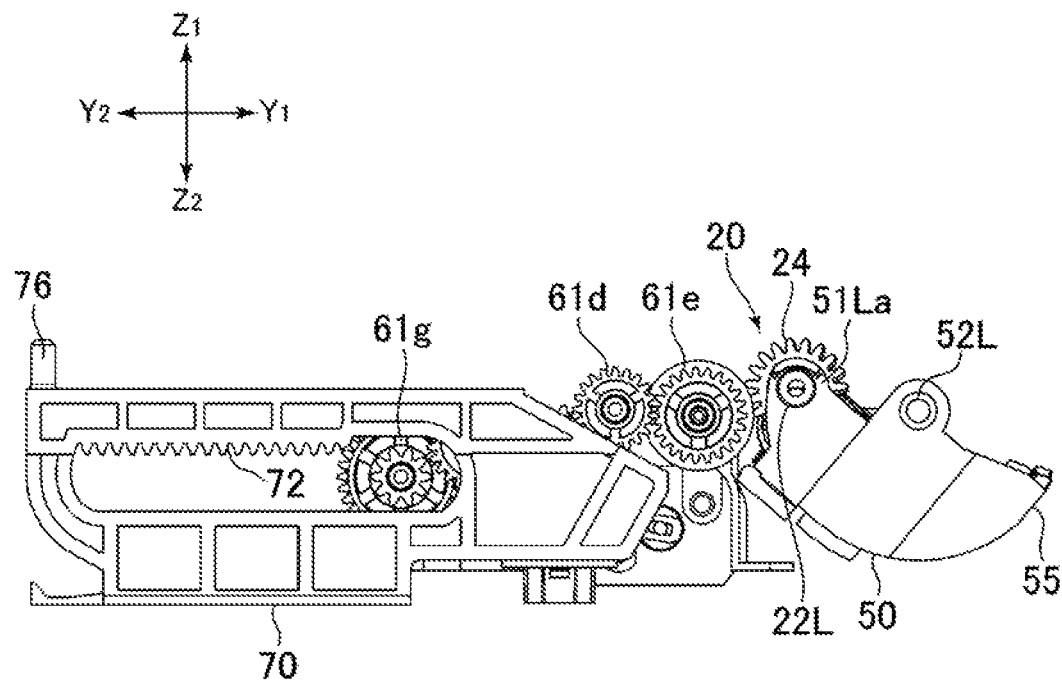
FIG. 9A is a left side view of a slider, the gears, and the roller bracket, depicting a case where the slider is placed in a first slide position.
Figure 9B:
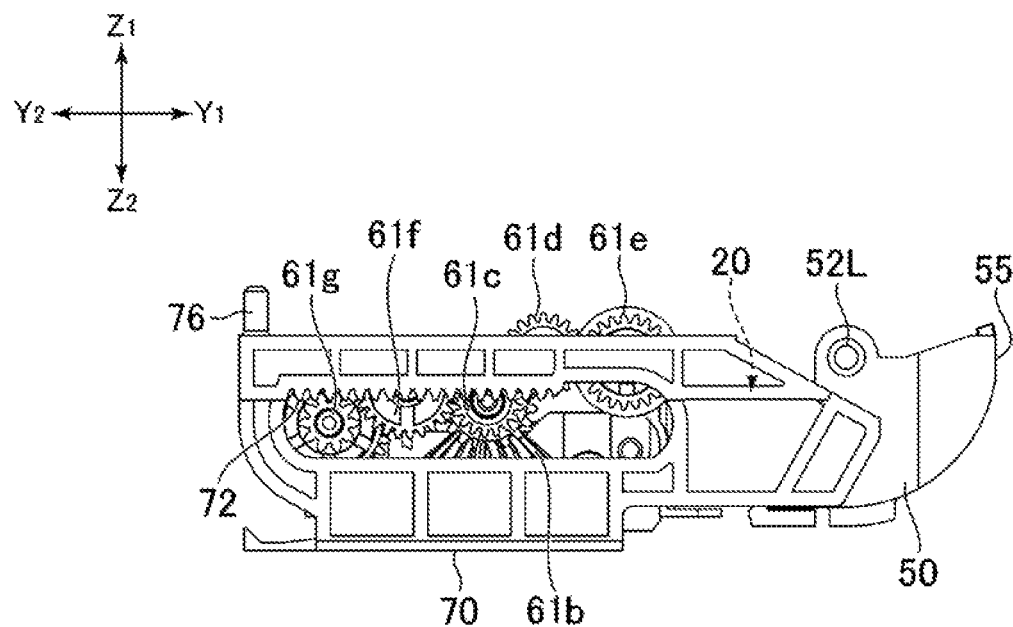
FIG. 9B is a left side view of the slider, the gears, and the roller bracket, depicting a case where the slider is placed in a second slide position.

FIGS. 9A and 9B are left side views of the slider 70, the gears, and the roller bracket 50. At the left end portion of the bottom frame 3, the slider 70 can move between a first slide position (first operation member position) and a second slide position (second operation member position) located in front of and away from the first slide position. FIG. 9A depicts a case where the slider 70 is placed in the first slide position, and FIG. 9B depicts a case where the slider 70 is placed in the second slide position located in front of the first slide position. As depicted in FIG. 9A, when the slider 70 is in the first slide position, the conveying roller 20 is placed in the conveying position. Further, as depicted in FIG. 9B, when the slider 70 is in the second slide position, the conveying roller 20 is placed in the retract position below the conveying position.

As depicted in FIG. 2B, a front end portion of the slider 70 is fitted inside a guide hole 35 formed at the left end portion (left side wall portion 32L) of the bottom frame 3. A guide surface 71 facing forward and obliquely downward is formed at the front end portion of the slider 70, and as depicted in FIG. 4, a guided portion 54 is formed at the left end portion of the roller bracket 50. The guided portion 54 protrudes leftward from the roller bracket 50. When the slider 70 moves from the first slide position to the second slide position, inside the bottom frame 3 or inside the guide hole 35, the guided portion 54 of the roller bracket 50 comes into contact with the guide surface 71 of the slider 70 and is pushed up by the guide surface 71. At this time, the roller bracket 50 rotates along the axis CA to move, to the retract position, the conveying roller 20 located behind the axis CA (see FIG. 9B).

A front end portion of the roller bracket 50 constitutes a shutter portion 55 configured to occlude the insertion port of the optical disc drive 1. The roller bracket 50 is pushed by the slider 70 and rotated around the axis CA and is thus located in front of the axis CA. At this time, the shutter portion 55 is placed above the conveying roller 20 and blocks the insertion port of the optical disc drive 1. Thus, when the optical disc is placed on the spindle motor 11, the user can be prevented from attempting to further insert another optical disc into the insertion port.

The conveying mechanism A includes, as the conveying roller position manipulation mechanism that moves the position of the conveying roller 20, the loading motor 60 and a second transmission mechanism that transmits rotation of the loading motor 60 to the slider 70 used as the conveying roller operation member. As depicted in FIG. 9B, inside the slider 70, formed is an operated portion 72 that is shaped like a rack and that extends along the front-back direction, and the operated portion 72 meshes with the gear 61g. In the present embodiment, the gears 61a to 61c, 61f, and 61g correspond to the second transmission mechanism. With the gear 61g rotating and with the gear 61 meshed with the operated portion 72, the slider 70 moves forward or backward. As depicted in FIGS. 2B and 7, at least a part of the loading motor 60 is located in front of the gear 61g constituting a back end of the second transmission mechanism. Note that the second transmission mechanism is not limited to the gears and may include belts or the like.

Further, the conveying mechanism A includes a distribution mechanism that engages with each of the first transmission mechanism that transmits the rotation of the loading motor 60 to the conveying roller 20 and the second transmission mechanism that transmits the rotation of the loading motor 60 to the slider 70 used as the conveying roller operation member, the distribution mechanism distributing the rotation of the loading motor 60 to the first transmission mechanism and the second transmission mechanism. Thus, the transmission path for the rotation of the loading motor 60 can be restrained from being elongated. In the present embodiment, as depicted in FIG. 8, the distribution mechanism includes an intermediate gear 61c that is a member different from the gear 61a (worm gear) corresponding to a member directly attached to the loading motor 60. The gear 61c used as the distribution mechanism is meshed both with the gear 61d included only in the first transmission mechanism and with the gear 61f included only in the second transmission mechanism.

Further, some of the members constituting the first transmission mechanism are disposed in a first direction with respect to the distribution mechanism, whereas some of the members constituting the second transmission mechanism are disposed in a second direction opposite to the first direction, with respect to the distribution mechanism. As depicted in FIG. 8, the gears 61d and 61e, which are included in the members constituting the first transmission mechanism but do not constitute the second transmission mechanism, are disposed in front of the gear 61c which constitutes the distribution mechanism, while the gears 61f and 61g, which are included in the members constituting the second transmission mechanism but do not constitute the first transmission mechanism, are disposed behind the gear 61c. Thus, compared to, for example, a case in which the members constituting only the first transmission mechanism and the members constituting only the second transmission mechanism are arranged ahead of the distribution mechanism in the same direction, the present embodiment allows both paths of the first transmission mechanism and the second transmission mechanism to be shortened. This allows the optical disc drive 1 as a whole to be miniaturized, and enables torque loss caused by an elongated transmission path to be reduced.

As depicted in FIG. 7, the optical disc drive 1 includes a holder 62 holding the first transmission mechanism, the second transmission mechanism, and the loading motor. The loading motor 60 is fitted into the holder 62, and the gears 61c to 61g are supported by the holder 62. As depicted in FIGS. 2B and 7, while being held by the holder 62, the loading motor 60 and the gears 61a to 61g constituting the first and second transmission mechanisms are disposed at an inner left end portion of the bottom frame 3 which is generally shaped like a box. In this regard, the conveying roller 20 is disposed in front of the loading motor 60, the gears 61a to 61g, and the holder 62. In other words, the conveying roller 20 is disposed closer to the insertion port for the optical disc than the loading motor 60, the gears 61a to 61g, and the holder 62 are. Thus, in the vicinity of the insertion port, the optical disc is conveyed backward, facilitating insertion of the optical disc.

Further, the first transmission mechanism and the second transmission mechanism are disposed inside the bottom frame 3, and the slider 70 used as the conveying roller operation member is disposed outside the bottom frame 3. The slider 70 is disposed on the left of the left side wall portion 32L of the bottom frame 3 which is generally shaped like a box, and is disposed adjacent to the gears 61a to 61g across the left side wall portion 32L. By the slider 60 being disposed outside the bottom frame 3 as described above, when the slider 60 moves in the front-back direction, internal components of the bottom frame 3 can be prevented from interfering with the slider 60.

Figure 10A:
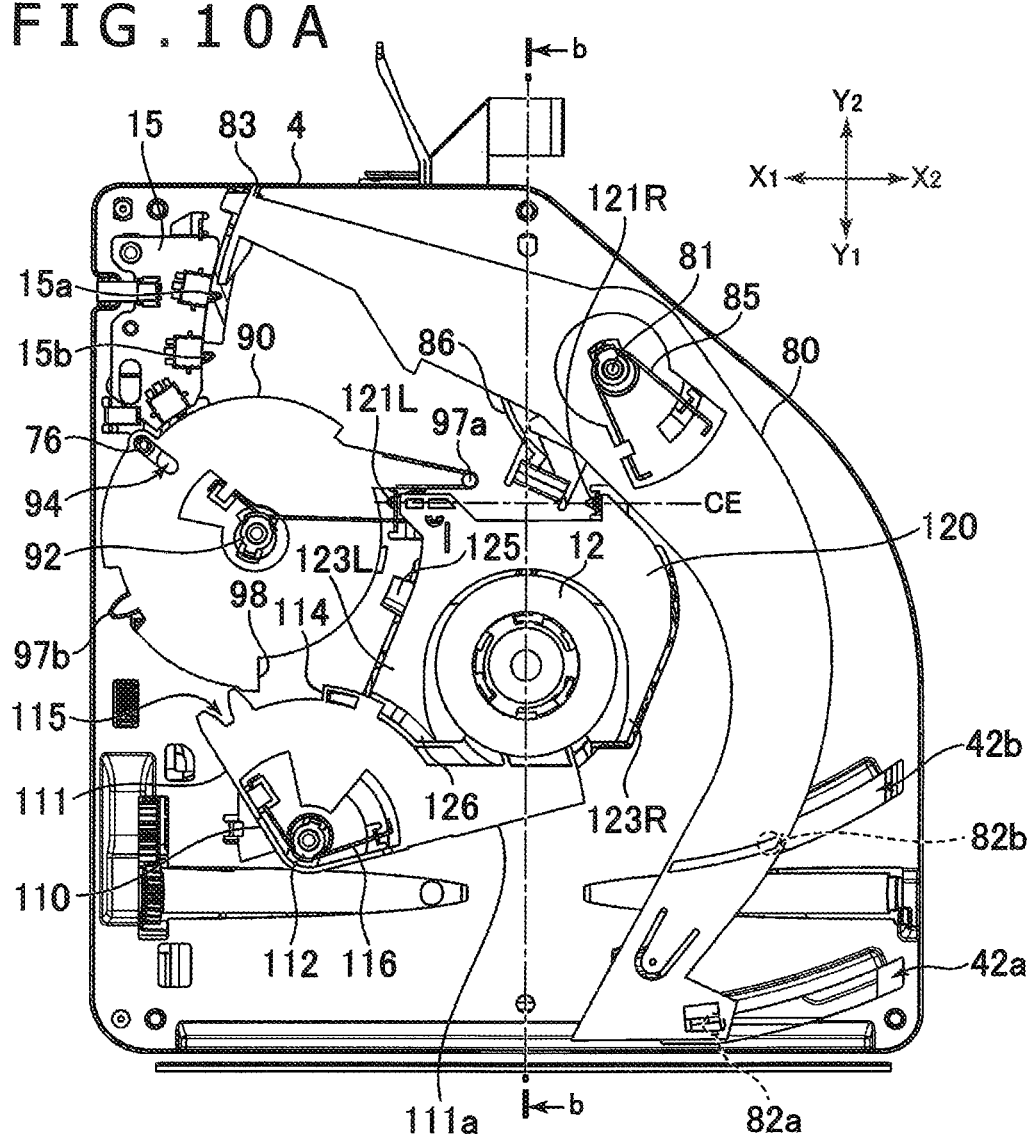
FIG. 10A is a top view of the top frame, depicting a case where no disc is present in the optical disc drive.
Figure 11:
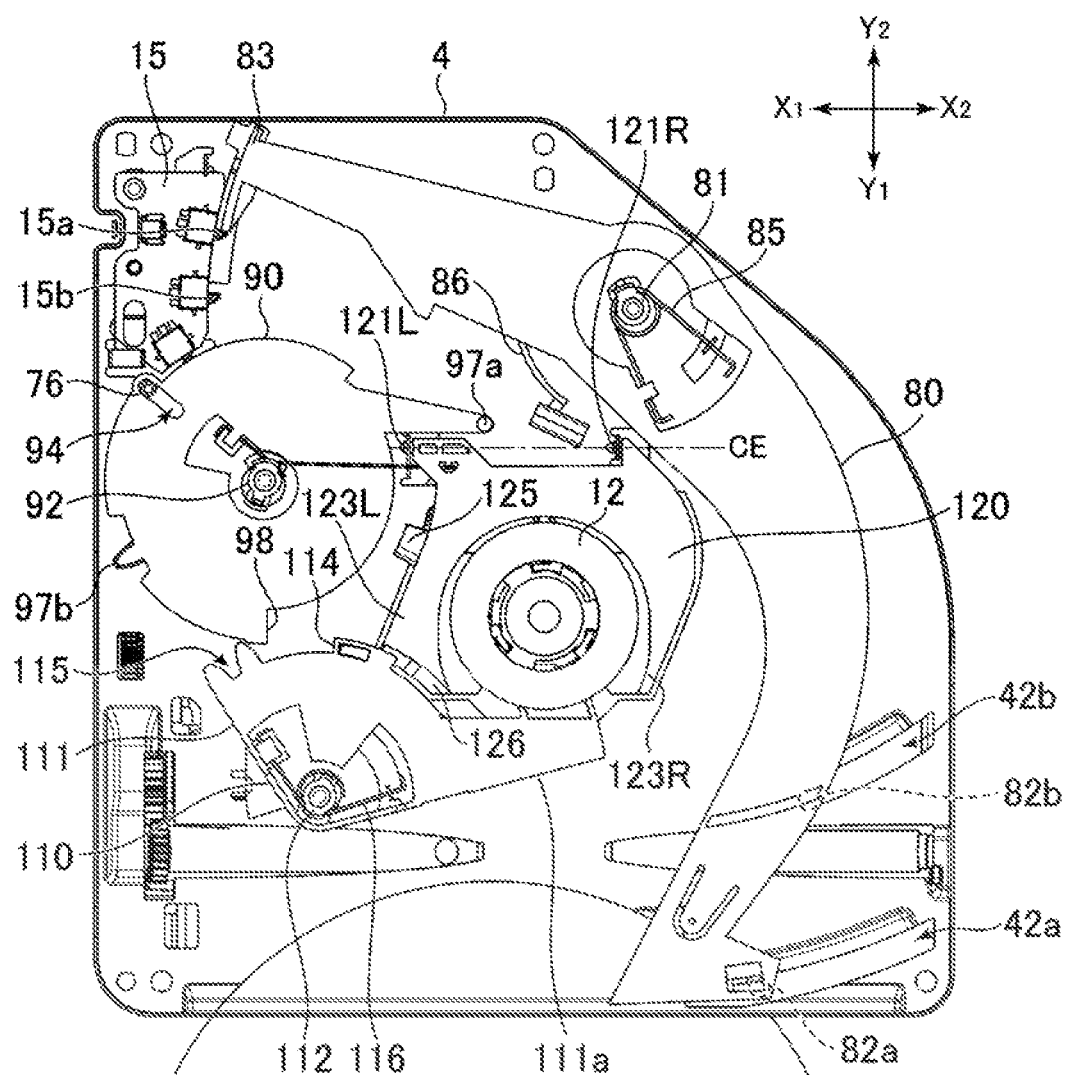
FIG. 11 is a top view of the top frame, depicting a case where a disc is placed in an insertion port of the optical disc drive.
Figure 12A:
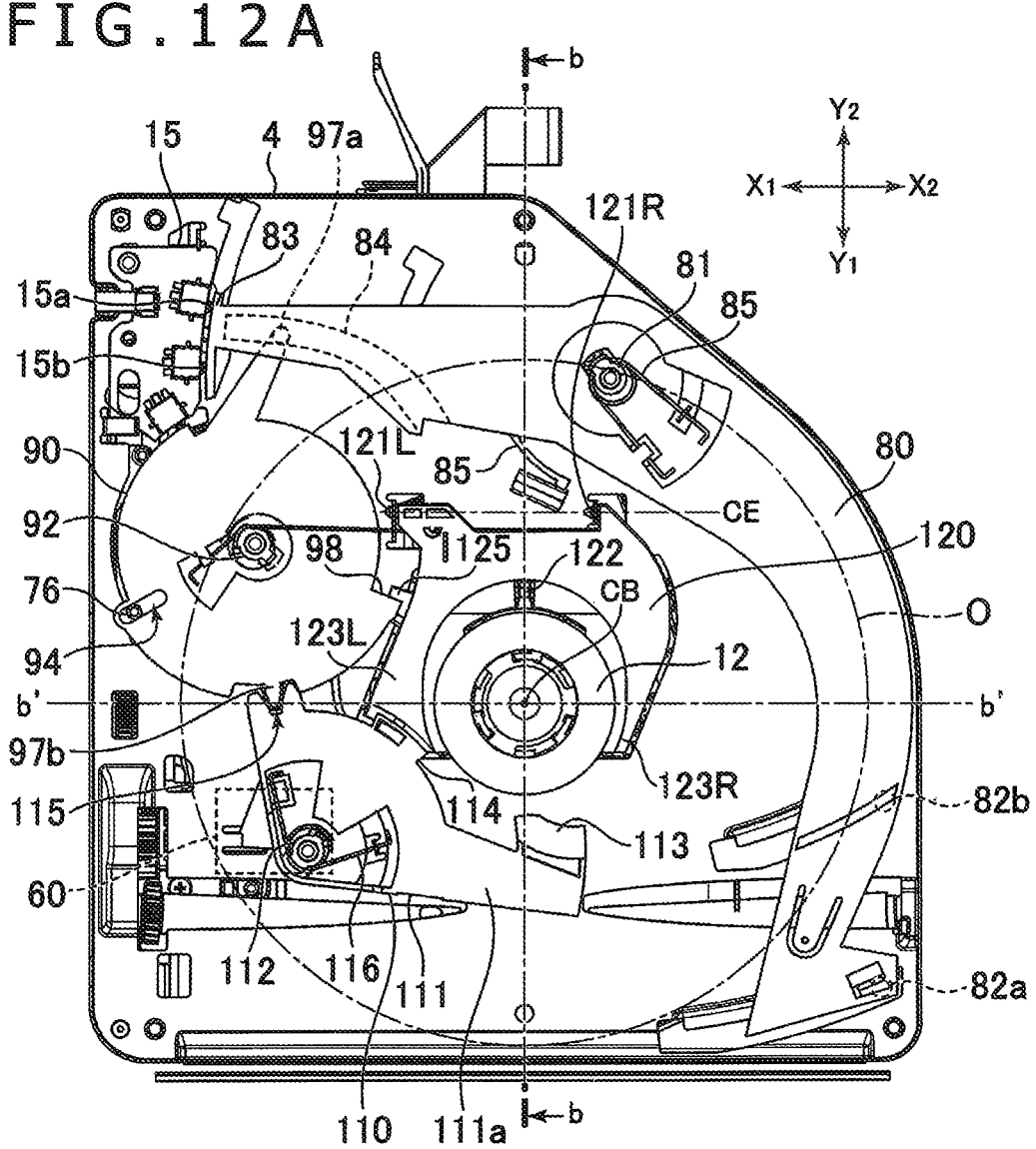
FIG. 12A is a top view of the top frame, depicting a case where the disc is placed in a drive position in the optical disc drive.

FIGS. 10A, 11, and 12A are top views depicting a state in which various members are disposed in the top frame 4. FIG. 10A depicts a case where no disc is present in the optical disc drive 1, FIG. 11 depicts a case where the optical disc O is placed (inserted) in the insertion port of the optical disc drive 1, and FIG. 12A depicts a case where the optical disc drive 1 is placed in the drive position. In addition to the loading motor 60 and the gears 61a to 61e (first transmission mechanism), the conveying roller driving mechanism that rotates the conveying roller 20 includes the switch board 15 and the switch arm 80 which are disposed in the top frame 4.

As depicted in FIG. 10A, the switch board 15 is disposed at a position corresponding to a left end portion of the top frame 4 and a back end portion of the top frame 4. The switch board 15 includes a start switch 15a and a stop switch 15b, which will be described below, respectively disposed at a right edge portion and at a left edge portion of the switch board 15. The switch board 15 is electrically connected to the loading motor 60 via wiring or the like. The start switch 15a and the stop switch 15b are configured to control a driving period for the loading motor (the period when the loading motor is to be driven). More specifically, the start switch 15a and the stop switch 15b are configured to detect the position of the optical disc and to control the rotation of the loading motor 60 according to the detected position of the optical disc. The start switch 15a is pressed to start rotation of the loading motor 60 (see FIG. 11). Further, when the stop switch 15b is pressed in a state in which the start switch 15a is being pressed, the rotation of the loading motor 60 is stopped (see FIG. 12A).

As depicted in FIGS. 2A and 12A, the loading motor 60 is disposed at the position where the loading motor 60 is overlaid on the optical disc O placed at the position of the spindle motor 11 as viewed from the direction of the rotation axis (axis CB) of the spindle motor 11. Thus, compared to, for example, a case in which the loading motor 60 is disposed behind the optical disc O placed at the position of the spindle motor 11, the present embodiment allows shortening of the path for the first transmission mechanism along which the rotation of the loading motor 60 is transmitted to the conveying roller 20. This enables reduction in torque loss caused by an elongated transmission path for the rotation of the loading motor 60.

Further, as depicted in FIG. 12A, the switch board 15, equipped with the start switch 15a and the stop switch 15b configured to control the driving period for the loading motor, is located behind the optical disc O placed at the position of the spindle motor 11 as viewed from the direction of the rotation axis (axis CB) of the spindle motor 11. Thus, compared to, for example, a case in which the switch board 15 is disposed at the position where the switch board 15 is overlaid on the optical disc O placed at the position of the spindle motor 11, the present embodiment allows the optical disc drive 1 to be miniaturized in the up-down direction.

The switch arm 80 also functions as a centering mechanism B for positioning the optical disc conveyed to the position of the spindle motor 11. In the present embodiment, one switch arm 80 is provided. The switch arm 80 is disposed at a position corresponding to a right side and a back side on the top frame 4 and has a shape curved along an outer edge of the top frame 4. One end (front end portion) of the switch arm 80 extends to the insertion port for the optical disc, and the other end (back end portion) of the switch arm 80 extends to the left side and the back side on the top frame 4. The switch arm 80 includes a supported portion 81 shaped like a tube and attached to the top frame 4. The switch arm 80 is rotatable around an axis (rotational center axis) extending through the center of the supported portion 81 in the up-down direction. As depicted in FIG. 12A, the rotational center axis of the switch arm 80 is disposed at a position corresponding to a right side of a first plane (a plane including a line b-b in FIG. 12A) and to a back side (the side opposite to contact portions 82a and 82b described below) on a second plane (a plane including a line b'-b' in FIG. 12A), the first plane extending through the rotational center axis (axis CB) of the spindle motor 11 along the front-back direction, the second plane extending orthogonally to the first plane and through the rotational center axis (axis CB) of the spindle motor 11. When the rotational center axis of the switch arm 80 is disposed behind the spindle motor 11 as described above, the switch arm 80 can be provided with a certain length from the rotational center axis to a front end, allowing the front end portion of the switch arm 80 to be provided with a certain movable range in the lateral direction.

As depicted in FIG. 3, a spring 85 is attached to the switch arm 80. In a top view of the top frame 4 depicted in FIG. 10A, the spring 85 biases the switch arm 80 clockwise. Further, the switch arm 80 includes a leaf spring portion 86 contacting an internal structure of the top frame 4.

The front end portion of the switch arm 80 reaches an area located in front of the conveying roller 20 (the opening 41R formed in the top frame 4) inside the top frame 4. As depicted in FIG. 3, the switch arm 80 includes two contact portions 82a and 82b protruding downward. The contact portion 82a is formed at the front end portion of the switch arm 80, and the contact portion 82b is formed between the contact portion 82a and the supported portion 81. Further, openings 42a and 42b extending obliquely with respect to the lateral direction are formed on the right side of the top frame 4. The openings 42a and 42b are formed in juxtaposition across the opening 41R in the front-back direction. The contact portions 82a and 82b of the switch arm 80 penetrate, in the up-down direction, the openings 42a and 42b formed in the top frame 4. Each of tip portions of the contact portions 82a and 82b reaches a conveying path which is located inside the bottom frame 3 and through which the optical disc passes.

The switch arm 80 includes a switch operation portion 83 formed at a back end portion of the switch arm 80 to operate the start switch 15a and the stop switch 15b. Inside the top frame 4, the switch operation portion 83 is adjacent to the switch board 15 in the lateral direction. As depicted in FIG. 10A, in a case where no optical disc O is present in the optical disc drive 1, the switch operation portion 83 pushes neither the start switch 15a nor the stop switch 15b. As depicted in FIG. 11, in a case where the optical disc O is inserted into the insertion port of the optical disc drive 1, an edge of the optical disc O pushes the contact portion 82a rightward, moving the switch arm 80 counterclockwise with respect to the rotational center axis (the center of the supported portion 81). The switch operation portion 83 thus pushes only the start switch 15a. This starts rotation of the loading motor 60, transmitting the rotation to the conveying roller 20 via the first transmission mechanism (gears 61a to 61e). Then, the conveying roller 20 is rotated to convey, toward the position of the spindle motor 11, the optical disc O placed on the conveying roller 20.

Further, when the optical disc O is conveyed to the position of the spindle motor 11, the edge of the optical disc O pushes the contact portion 82b rightward. Thus, the switch arm 80 further moves counterclockwise with respect to the rotational center axis (the center of the supported portion 81), and the switch operation portion 83 pushes both the start switch 15a and the stop switch 15b. Then, the rotation of the loading motor 60 stops, and the rotation of the conveying roller 20 rotating via the first transmission mechanism also stops. The rotation of the loading motor 60 is stopped when the optical disc O is conveyed to the position of the spindle motor 11, as described above, and power consumption of the optical disc drive 1 can thus be reduced.

The conveying roller position manipulation mechanism that moves the position of the conveying roller 20 includes the rotary arm 90 (movable member) disposed in the top frame 4, in addition to the roller bracket 50, the loading motor 60, the gears 61a to 61c, 61f, and 61g (second transmission mechanism), and the slider 70. As depicted in FIG. 3, the rotary arm 90 includes a base portion 91 shaped like a disc, and is located, inside the top frame 4, in front of the switch board 15 and adjacent to the switch board 15 in the front-back direction. The rotary arm 90 includes a supported portion 92 shaped like a tube and located at the central position of the base portion 91 and attached to the top frame 4. The rotary arm 90 is rotatable along a rotational center axis extending in the up-down direction at the center of the supported portion 92. A spring 96 is attached to the inside of the rotary arm 90. In a top view (FIG. 10A) of the top frame 4, the spring 96 biases the rotary arm 90 clockwise with respect to the rotational center axis (the center of the supported portion 92).

Figure 13:
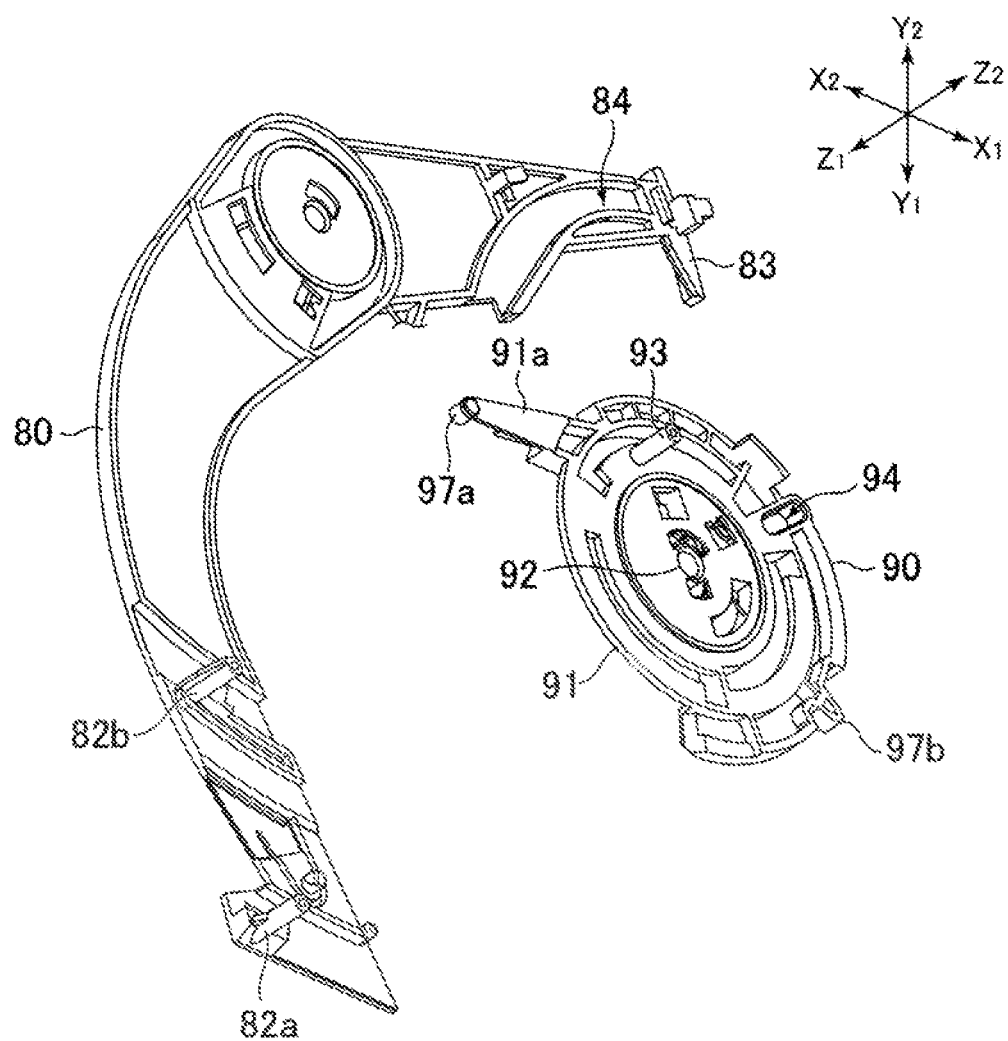
FIG. 13 is a perspective view depicting a back side of a switch arm and a rotary arm.

FIG. 13 is a perspective view depicting a back side of the switch arm 80 and the rotary arm 90. As depicted in FIG. 13, a contact portion 93 protruding downward is formed on the base portion 91 of the rotary arm 90 at a position away from the supported portion 92. Further, as depicted in FIG. 3, an opening 43 extending like a circular arc in the lateral direction is formed on the left side of the top frame 4. The contact portion 93 of the rotary arm 90 penetrates the opening 43 of the top frame 4 in the up-down direction. A tip portion of the contact portion 93 reaches the conveying path which is located inside the bottom frame 3 and through which the optical disc passes. As depicted in FIG. 13, the contact portion 93 of the rotary arm 90 is located behind the contact portions 82a and 82b of the switch arm 80. In other words, the contact portions 82a and 82b of the switch arm 80 are located in front of the contact portion 93 of the rotary arm 90.

The rotary arm 90 is moved in response to a collision of the optical disc that approaches the position of the spindle motor 11. In a top view of FIG. 11, during the process of conveying, to the position of the spindle motor 11, the optical disc O inserted into the insertion port of the optical disc drive 1, the contact portion 93 formed on the rotary arm 90 is pushed leftward by the edge of the disc, thus rotating the rotary arm 90 counterclockwise with respect to the rotational center axis (the center of the supported portion 92).

Further, as depicted in FIG. 3, the rotary arm 90 is provided with a slot portion 94 extending from an output edge portion (more specifically, a projecting portion 98 described below) of the rotary arm 90 toward the supported portion 92. As depicted in FIG. 2B, the slider 70 includes a cover portion 75 covering a part of the left side wall portion 32L of the bottom frame 3, and a shaft portion 76 extending in the up-down direction is formed at a right end portion of the cover portion 75. An opening 44 extending in the front-back direction is formed on the left side of the top frame 4, and the shaft portion 76 of the slider 70 penetrates the inside of the opening 44. In other words, a tip portion of the shaft portion 76 is disposed inside the top frame 4.

As depicted in FIG. 4, the shaft portion 76 formed on the slider 70 is fitted inside the slot portion 94 formed in the rotary arm 90. In this state, counterclockwise rotation of the rotary arm 90 moves the position of the slot portion 94 forward. In this regard, an edge of the slot portion 94 pushes the shaft portion 76 forward, thus moving the slider 70 forward as well. When the slider 70 is in the first slide position depicted in FIG. 9A, an operated portion 72 shaped like a rack and formed inside the slider 70 is not meshed with the gear 61g constituting the second transmission mechanism. In this regard, the rotary arm 90 is rotated by being pushed by the optical disc inserted into the optical disc drive 1, and the slot portion 94 of the rotary arm 90 pushes out the shaft portion 76 of the slider 70 forward, bringing the operated portion 72 inside the slider 70 into mesh with the gear 61g. Subsequently, the slider 70 pushes roller bracket 50 down to place the conveying roller 20 in the retract position. As described above, movement of the slider 70 is started during the process of conveying the optical disc to the position of the spindle motor 11, and the conveying roller 20 can thus be moved to the retract position after the optical disc is placed on the spindle motor 11.

3. Centering Mechanism

Figure 14:
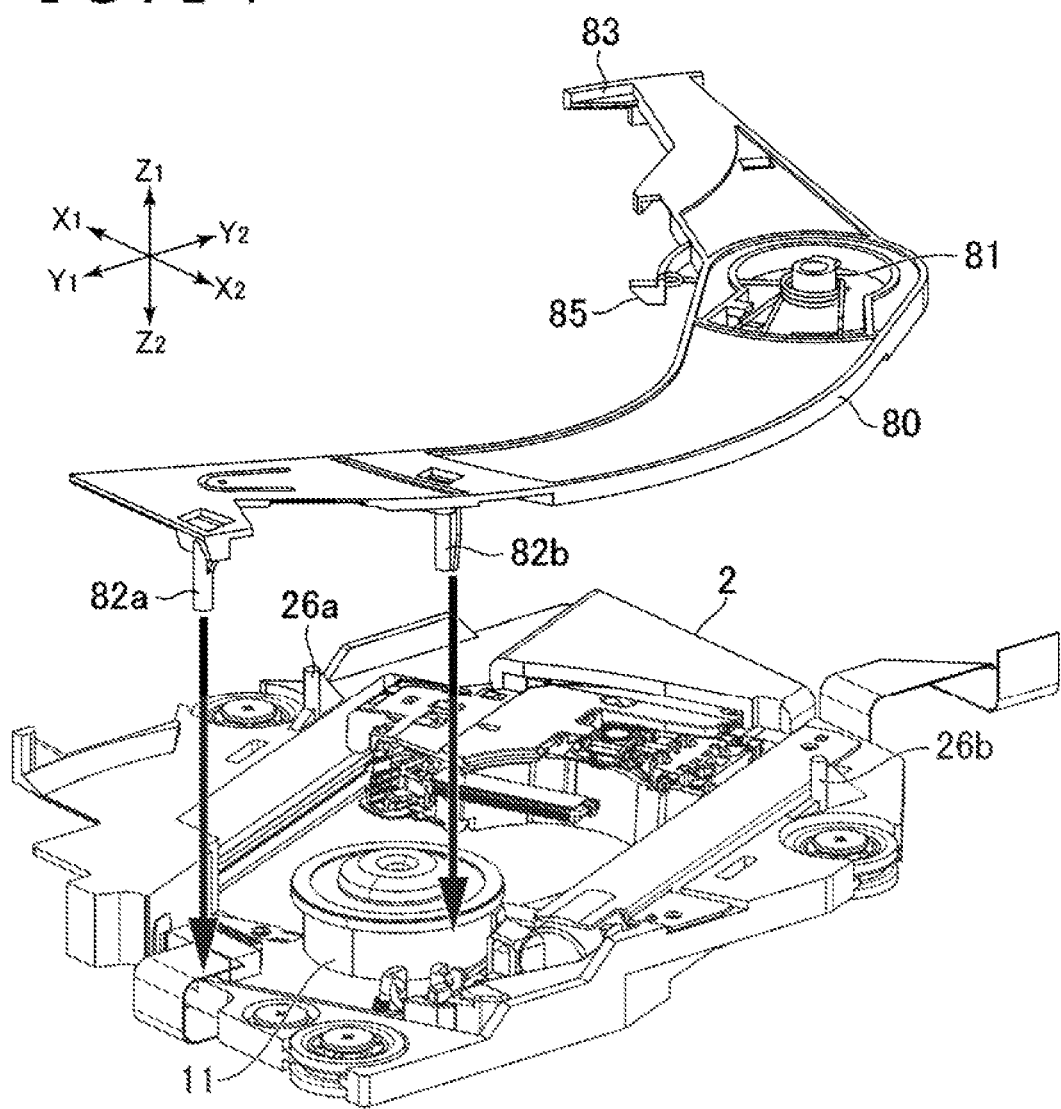
FIG. 14 is a perspective view of the base frame and the top frame.

Now, description will be given of a configuration of the centering mechanism B that aligns, with the central position (drive position) of the spindle motor 11, the central position of the optical disc conveyed by the conveying mechanism A. FIG. 14 is a perspective view of the base frame 2 and the top frame 4. The centering mechanism B is implemented by the base frame 2 and the switch arm 80 disposed in the top frame 4.

As depicted in FIG. 14, the base frame 2 that holds the spindle motor 11 is provided with a plurality of stopper portions 26a and 26b that contact an outer edge of the optical disc having reached the position of the spindle motor 11 and that restrict backward movement of the optical disc. Each of the stopper portions 26a and 26b is shaped like a column extending upward from an upper surface of the base frame 2 and is formed integrally with the base frame 2. By the stopper portions 26a and 26b being integrally formed on the base frame 2 that holds the spindle motor 11, as described above, change in the positions of the stopper portions 26a and 26b relative to the spindle motor 11 can be suppressed, allowing misalignment between the central position of the optical disc and the drive position to be inhibited. Further, as depicted in FIG. 2A, the two stopper portions 26a and 26b are disposed away from each other in the rotating direction of the optical disc. In addition, the two stopper portions 26a and 26b may be integrally formed on the base frame 2 to which the spindle motor 11 is attached, and may be provided fixedly at predetermined positions with respect to the spindle motor 11. By the plurality of stopper portions 26a and 26b being provided as described above, the central position of the optical disc can be placed stably in the drive position. Note that the number of stopper portions integrally formed on the base frame 2 may be one or may be three or more.

Further, the centering mechanism B includes the switch arm 80, used as a bias member, including the contact portions 82a and 82b which contact the outer edge of the optical disc that moves toward the position of the spindle motor 11. The switch arm 80 uses the contact portions 82a and 82b to align the center of the optical disc with the position of the spindle motor 11. The switch arm 80 functions as a bias member biased by the spring 85 such that the contact portions push the optical disc toward the stopper portions 26a and 26b. The switch arm 80 and the contact portions 82a and 82b function to allow the central position of the optical disc to be guided to the drive position corresponding to the rotation center of the spindle motor 11. Further, since the one switch arm 80 is provided in the present embodiment, it is possible to reduce the number of components of the optical disc drive 1 compared to a case in which a plurality of bias members are provided.

As depicted in FIG. 12A, the contact portions 82a and 82b formed on the switch arm 80 are disposed on a side opposite to the stopper portions 26a and 26b across the optical disc having reached the position of the spindle motor 11. The contact portions 82a and 82b are disposed on one of the right side and the left side of the first plane (the plane including the line b-b in FIG. 12A) described above. In the present embodiment, the contact portions 82a and 82b are disposed only on the right side of the first plane described above. Further, the contact portions 82a and 82b are disposed on a front side of the second plane (the plane including the line b'-b' in FIG. 12A) described above.

In addition, as depicted in FIG. 2A, in the base frame 2, the stopper portion 26b is disposed on the other side (the left side in the present embodiment) of the first plane (the plane including a line b-b in FIG. 2A) described above, and the stopper portions 26a and 26b are each arranged on a back side on the second plane (the plane including the line b'-b' in FIG. 12A) described above. When the contact portions 82a and 82b and the stopper portion 26a and 26b are disposed as described above, the optical disc conveyed to the position of the spindle motor 11 can be pushed in both the front-back direction and the lateral direction, allowing the optical disc to be aligned in these two directions.

As described above, during the process in which the optical disc is conveyed toward the position of the spindle motor 11, the rotary arm 90 is rotated in response to a collision with the optical disc. In this regard, the rotary arm 90 includes a first protruding portion 97a as a portion engaged with the switch arm 80, the first protruding portion 97a protruding upward and being provided at an end portion of an arm portion 91a extending from the base portion 91 shaped like a disc. The slot portion 94, the arm portion 91a, and a second protruding portion 97b described below that are formed on the rotary arm 90 are disposed apart from one another in a circumferential direction of the base portion 91 shaped like a disc.

As depicted in FIG. 13, a groove portion 84 is formed in a lower surface of a back end portion of the switch arm 80. The switch arm 80 used as a member constituting the centering mechanism B is coupled to the rotary arm 90 via the groove portion 84. Specifically, the centering mechanism B includes the switch arm 80 used as a member coupled to the rotary arm 90 used as a movable member. The rotary arm 90 is engaged with the switch arm 80 via the first protruding portion 97a. When the optical disc reaches the position of the spindle motor 11, the rotary arm 90 moves the switch arm 80 such that contact portions 82a and 82b of the switch arm 80 move away from the optical disc. When the rotary arm 90 is rotated in response to a collision with the optical disc, the first protruding portion 97a of the rotary arm 90 is fitted inside the groove portion 84 of the switch arm 80 to push an edge of the groove portion 84 forward, thus moving the switch arm 80. Thus, the switch arm 80 moves in a direction (counterclockwise direction in FIG. 11) opposite to the bias direction of the spring 85, and the contact portions 82a and 82b formed on the switch arm 80 move away from the optical disc placed at the position of the spindle motor 11 (in the drive position). As depicted in FIG. 12A, with the optical disc O placed in the drive position, the contact portions 82a and 82b are placed away from the edge of the optical disc O. This avoids the contact between the optical disc O placed in the drive position and the contact portions 82a and 82b, allowing smooth rotation of the optical disc O to be achieved.

4. Chucking Mechanism

Now, description will be given of the chucking mechanism C that fixes the optical disc at the central position of the spindle motor 11 (in the drive position). As depicted in FIG. 3, the chucking mechanism C includes the chucking pulley 12. The chucking pulley 12 is a member fixing the optical disc to the spindle motor 11, and is movable between a position where the chucking pulley 12 is located above and away from the spindle motor 11 (first pulley position) and a position where the chucking pulley 12 approaches and holds the optical disc between the chucking pulley 12 and the spindle motor 11 (second pulley position). The chucking pulley 12 includes a magnet 13 in an inner central portion of the chucking pulley 12. Further, a fixing member 14 configured to fix the magnet 13 is attached to the inside of the chucking pulley 12. The chucking pulley 12 is attracted to the spindle motor 11 by a magnetic force of the magnet 13.

Figure 10B:
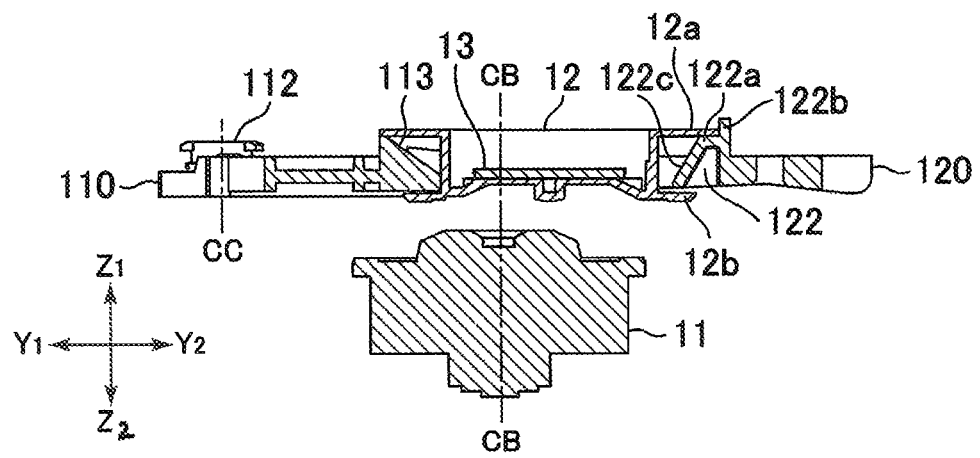
FIG. 10B is a cross-sectional view taken along a line b-b depicted in FIG. 10A.
Figure 12B:
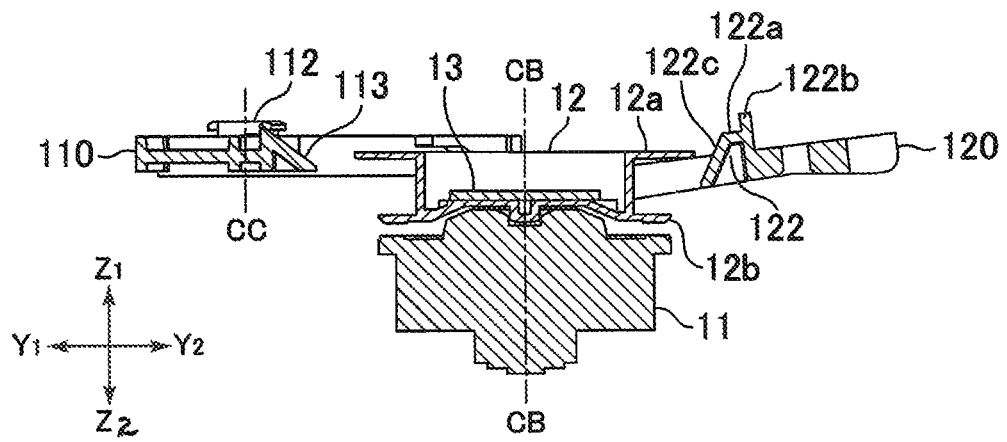
FIG. 12B is a cross-sectional view taken along a line b-b depicted in FIG. 12A.

FIG. 10B and FIG. 12B are diagrams depicting operations of the chucking mechanism C. FIG. 10B is a cross-sectional view taken along a line b-b in FIG. 10A, and FIG. 12B is a cross-sectional view taken along the line b-b in FIG. 12A. The chucking pulley 12 depicted in FIG. 10A and FIG. 10B is placed in a first pulley position, and the chucking pulley 12 depicted in FIG. 12A and FIG. 12B is placed in a second pulley position located below and in front of the first pulley position. When the chucking pulley 12 is placed in the second pulley position, the magnetic force is exerted between the chucking pulley 12 and the spindle motor 11 to hold the optical disc therebetween. Thus, the optical disc rotates integrally with the spindle motor 11.

The chucking mechanism C includes a pulley position manipulation mechanism configured to manipulate the position of the chucking pulley 12. As depicted in FIGS. 3, 10A, and 12A, the pulley position manipulation mechanism includes a first check arm 110 (manipulation arm) that engages with the chucking pulley 12 and moves the position of the chucking pulley 12. Further, the first check arm 110 constituting the pulley position manipulation mechanism and the rotary arm 90 are disposed on a common support board (top frame 4), the rotary arm 90 being a movable member rotated in response to a collision with the optical disc and moving the first check arm 110. Inside the top frame 4, the first check arm 110 is disposed on the left side of the top frame 4 and in front of the rotary arm 90. Specifically, the first check arm 110 constituting the pulley position manipulation mechanism and the rotary arm 90 used as a movable member are disposed on a side opposite to (to the left of, in the present embodiment) the switch arm 80 across the first plane (the lines b-b depicted in FIGS. 10A and 12A) described above. As described above, by the pulley position manipulation mechanism being disposed, inside the top frame 4, on the side opposite to the switch arm 80, the inner space of the top frame 4 can effectively be utilized.

Further, a second check arm 120 is disposed at the central position of the top frame 4. The second check arm 120, along with the first check arm 110, supports an outer circumferential portion of the chucking pulley 12. As depicted in FIG. 3, an opening 45 is formed at the central position of the top frame 4. The second check arm 120 is disposed inside the opening 45. The second check arm 120 includes shaft portions 121L and 121R provided at a back end portion of the second check arm 120 and arranged in the lateral direction. The second check arm 120 is rotatable in the up-down direction around an axis CE extending through the center of the shaft portions 121L and 121R in the lateral direction. The second check arm is biased upward by a spring not illustrated.

The first check arm 110 includes a fan-shaped base portion 111 and a supported portion 112 located at the central position of the fan-shaped base portion 111. The first check arm 110 is rotatable around an axis CC (see FIGS. 10B and 12B) as the rotational center axis extending through the center of the supported portion 112 along the up-down direction. Further, a spring 116 is attached to the first check arm 110. The first check arm 110 is biased counterclockwise around the axis CC by an elastomeric force of the spring 116.

Further, the chucking pulley 12 includes two flange portions 12a and 12b that are provided at an outer circumferential portion of the chucking pulley 12 and project in a radial direction. The two flange portions 12a and 12b are spaced apart from each other in the up-down direction. The first and second check arms 110 and 120 respectively include support portions 113 and 122 that support the chucking pulley 12. As depicted in FIG. 10A, the support portion 113 is formed at an end portion of an arm portion 111a extending outward from the fan-shaped base portion 111 of the first check arm 110, the support portion 113 extending backward from the end portion. The support portion 122 is formed on the second check arm 120 and located between the shaft portions 121L and 121R in the lateral direction and in front of the axis CE. In a case where the chucking pulley 12 is placed in the first pulley position, the support portions 113 and 122 are placed between the two flange portions 12a and 12b arranged in the up-down direction, as depicted in FIG. 10B. The support portions 113 and 122 are thus caught at the flange portion 12a. The support portion 113 of the first check arm 110 is caught at a front end of the flange portion 12a, whereas the support portion 122 of the second check arm 120 is caught at a back end of the flange portion 12a. Thus, the support portions 113 and 122 support the chucking pulley 12 against gravity and the magnetic force of the magnet 13.

A back end portion of the support portion 122 of the second check arm 120 is provided with a guide wall 122b protruding upward from an upper surface 122a of the support portion 122 and a slope 122c extending forward and downward from the upper surface 122a. As depicted in FIG. 10B, when the chucking pulley 12 is placed in the first pulley position, the chucking pulley 12 is pushed backward by the support portion 113 of the first check arm 100, and an edge of a back end of the flange portion 12a comes into contact with the guide wall 122b. This enables the chucking pulley 12 to be restrained from moving to behind the support portion 122, allowing the chucking pulley 12 to be inhibited from coming off from the support portions 113 and 122.

As depicted in FIG. 10A, the second check arm 120 includes a left arm portion 123L extending forward from a left side of the support portion 122 and a right arm portion 123R extending forward from a right side of the support portion 122. The left and right arm portions 123L and 123R are located away from each other in the lateral direction. A cutout portion 124 is formed between the left and right arm portions 123L and 123R and opens downward. The support portion 122 located behind the cutout portion 124 protrudes upward with respect to the left and right arm portions 123L and 123R. The chucking pulley 12 is fitted between the left and right arm portions 123L and 123R (inside the cutout portion 124). The flange portions 12a and 12b formed in the chucking pulley 12 each have a diameter larger than the width of the cutout portion 124 (see FIG. 3) in the lateral direction, and the flange portions 12a and 12b are overlaid on the left and right arm portions 123L and 123R in the up-down direction. This allows the chucking pulley 12 to be restrained from coming off from the inside of the cutout portion 124 formed in the second check arm 120.

Further, as depicted in FIG. 10A, the first check arm 110 includes a projecting portion 114 projecting outward from the fan-shaped base portion 111. The projecting portion 114 is overlaid on a pressed portion 126 located at a front end portion of the left arm portion 123L of the second check arm 120, thus pushing the pressed portion 126 downward. The projecting portion 114 pushes a front end portion (pressed portion 126) of the second check arm 120 downward as described above, thus restricting the second check arm 120 from being tilted upward due to the elastomeric force of the spring. As depicted in FIG. 10B, in a case where the chucking pulley 12 is placed in the first pulley position, the second check arm 120 is placed along a horizontal plane (a plane perpendicular to the axis CB of the spindle motor 11) by the projecting portion 114. In this case, as depicted in FIG. 10B, the support portion 122 of the second check arm 120 is placed in a position (hereinafter referred to as a support position) where the support portion 122 supports the flange portion 12a of the chucking pulley 12, and an upper surface 122a of the support portion 122 is placed in a position along the horizontal surface.

Further, the first check arm 110 protrudes outward from the fan-shaped base portion 111, and includes a recessed portion 115 whose center is cut out. The arm portion 111a provided with the support portion 113, the projecting portion 114, and the recessed portion 115 are disposed apart from one another in the rotating direction of the first check arm 110. As depicted in FIG. 12A, the first check arm 110 used as a member constituting a chucking pulley operation mechanism is coupled to the rotary arm 90 via the recessed portion 115. In other words, the chucking pulley operation mechanism includes the first check arm 110 used as a member coupled to the rotary arm 90 used as a movable member. More specifically, the recessed portion 115 formed in the first check arm 110 corresponds to the shape of a second protruding portion 97b formed on the rotary arm 90, and the first check arm 110 is directly coupled to the second protruding portion 97b of the rotary arm 90 via the recessed portion 115, and is interlocked with the rotary arm 90. When the slider 70 is moved to the second slide position to rotate the rotary arm 90 counterclockwise with respect to the rotational center axis (the center of the supported portion 92), the recessed portion 115 of the first check arm 110 engages with the second protruding portion 97b of the rotary arm 90. The first check arm 110 also rotates clockwise around the axis CC in such a manner as to be pulled by the second protruding portion 97b. Thus, the support portion 113 formed on the arm portion 111a of the first check arm 110 moves forward and is removed from the flange portion 12a of the chucking pulley 12.

As depicted in FIG. 13, the rotary arm 90 is provided with a projecting portion 98 projecting outward from an outer edge of the base portion 91. Further, as depicted in FIG. 10A, a projecting portion 125 projecting leftward is formed on a left side surface of the left arm portion 123L of the second check arm 120. As depicted in FIG. 12A, when the rotary arm 90 rotates counterclockwise, the projecting portion 98 of the rotary arm 90 is overlaid on the projecting portion 125 of the second check arm 120 to push the projecting portion 125 downward. Thus, the second check arm 120 located on the horizontal plane is pushed further downward and tilted downward with respect to the horizontal surface. In this case, the support portion 122 of the second check arm 120 is placed in a position depicted in FIG. 12B (hereinafter referred to as a release position), and the upper surface 122a of the support portion 122 is placed in a position along the direction inclined with respect to the horizontal plane.

As depicted in FIG. 12B, in a case where the support portion 122 is placed in the release position, the upper surface 122a of the support portion 122 is inclined with respect to the horizontal plane, and the support portion 113 of the first check arm 110 is located off from the flange portion 12a of the chucking pulley 12. Thus, when the support portion 122 moves to the release position, the flange portion 12a moves from the upper surface 122a of the support portion 122 to be closer to the spindle motor 11 in such a manner as to slide on the slope 122c located in front of the flange portion 12a. The flange portion 12a is thus placed in the second pulley position where the flange portion 12a holds the optical disc between the flange portion 12a and the spindle motor 11. At this time, before the chucking pulley 12 is attracted to the spindle motor 11 by the magnetic force of the magnet 13, the flange portion 12a comes into contact with the left and right arm portions 123L and 123R of the second check arm 120. This enables a shock caused when the chucking pulley 12 is attracted to the spindle motor 11 to be reduced, allowing the chucking pulley 12 to be restrained from being moved out of the second pulley position due to the shock.

Further, clockwise rotation of the rotary arm 90 in the state depicted in FIG. 12A releases the engagement between the second protruding portion 97b of the rotary arm 90 and the recessed portion 115 of the first check arm 110, leading to counterclockwise rotation of the first check arm 110 due to the elastomeric force of the spring 116. Then, the support portion 113 of the first check arm 110 pushes backward the chucking pulley 12 placed in the second pulley position. The flange portion 12a of the chucking pulley 12 runs onto the slope 122c formed on the second check arm 12, and is placed on the support portion 122. Thus, the chucking pulley 12 is pushed up from the second pulley position to the first pulley position behind and above the second pulley position, enabling the optical disc to be conveyed (discharged) from the drive position to the outside of the insertion port. As described above, the support portion 122 of the second check arm 120 is movable between the support position depicted in FIG. 10B and the release position depicted in FIG. 12B.

5. Overall Movement

Movement of the mechanisms made when the optical disc is inserted into the insertion port of the optical disc drive 1 will be described. As depicted in FIG. 11, in a top view of the top frame 4, the contact portion 82a of the switch arm 80 is pushed rightward by the edge of the optical disc to rotate the switch arm 80 counterclockwise with respect to the rotational center axis (the center of the supported portion 81). The switch operation portion 83 formed at the back end portion of the switch arm 80 pushes the start switch 15a of the switch board 15. This starts rotation of the loading motor 60, rotating the conveying roller 20 via the first transmission mechanism (gears 61a to 61e) and the gear 24 (see FIG. 2B). In this case, in addition to the gears 61a to 61e constituting the first transmission mechanism, also the gears 61f and 61g constituting the second transmission mechanism rotate. In the conveying position, the conveying roller 20 is in contact with a lower edge of the optical disc, and therefore, when the conveying roller 20 constituting the conveying mechanism A rotates, the optical disc is conveyed toward the spindle motor 11.

During the process of conveying the optical disc, the edge of the optical disc comes into contact with the contact portion 93 (see FIG. 13) protruding downward from the rotary arm 90, and in a top view (FIG. 11) of the top frame 4, the rotary arm 90 rotates counterclockwise. Thus, a pressed portion 73 of the slider 70 that engages with the slot portion 94 of the rotary arm 90 is pushed forward, and the operated portion 72 (see FIG. 9A) shaped like a rack and formed inside the slider 70 comes into mesh with the gear 61g constituting the second transmission mechanism. In FIG. 9A, the gear 61g is rotated clockwise by rotation of the loading motor 60, and the operated portion 72 thus comes into mesh with the gear 61g to convey the slider 70 to the second slide position located in front of the first slide position (see FIG. 9B). Then, the guide surface 71 formed at the front end portion of the slider 70 comes into contact with the guided portion 54 (see FIG. 4) formed at the left end portion of the roller bracket 50 to push the roller bracket 50 down. Thus, the conveying roller 20 is placed in the retract position located below and away from the conveying path for the optical disc.

The switch arm 80 is biased by the elastomeric force of the spring 85 of the switch arm 80, and the contact portions 82a and 82b formed on the switch arm 80 thus push the optical disc conveyed to the position of the spindle motor 11, guiding the central position of the optical disc to the position (drive position) of the rotation axis (axis CB) of the spindle motor 11. Further, the switch operation portion 83 formed at the back end portion of the switch arm 80 pushes the stop switch 15b of the switch board 15, thus stopping the rotation of the loading motor 60 (see FIG. 12A).

In the meantime, during the process in which the slider 70 is conveyed to the second slide position by the loading motor 60 and the second transmission mechanism (gears 61a to 61c and the gears 61f and 61g), the rotary arm 90 engaged with the slider 70 via the slot portion 94 rotates further clockwise in a top view of the top frame 4. Then, as depicted in FIG. 12A, the second protruding portion 97b of the rotary arm 90 engages with the recessed portion 115 of the first check arm 110, and the first check arm 110 rotates clockwise. Thus, the support portion 113 of the first check arm 110 comes off from the flange portion 12a of the check pulley 12. Further, the projecting portion 98 of the rotary arm 90 pushes down the projecting portion 125 of the second check arm 120, and the support portion 122 of the second check arm 120 is tilted downward. Thus, the check pulley 12 supported in the first pulley position is placed in the second pulley position, and the magnetic force is exerted between the magnet 13 and the spindle motor 11 to hold the optical disc between the check pulley 12 and the spindle motor 11. This enables the optical disc to be rotated integrally with the spindle motor 11.

Further, when the optical disc reaches the position of the spindle motor 11, the first protruding portion 97a formed on the rotary arm 90 pushes the edge of the groove portion 84 (see FIG. 13) formed in the switch arm 80, to separate the contact portions 82a and 82b of the switch arm 80 from the optical disc. This allows smooth rotation of the optical disc to be achieved.

6. Vibration Suppression Mechanism

Figure 15:
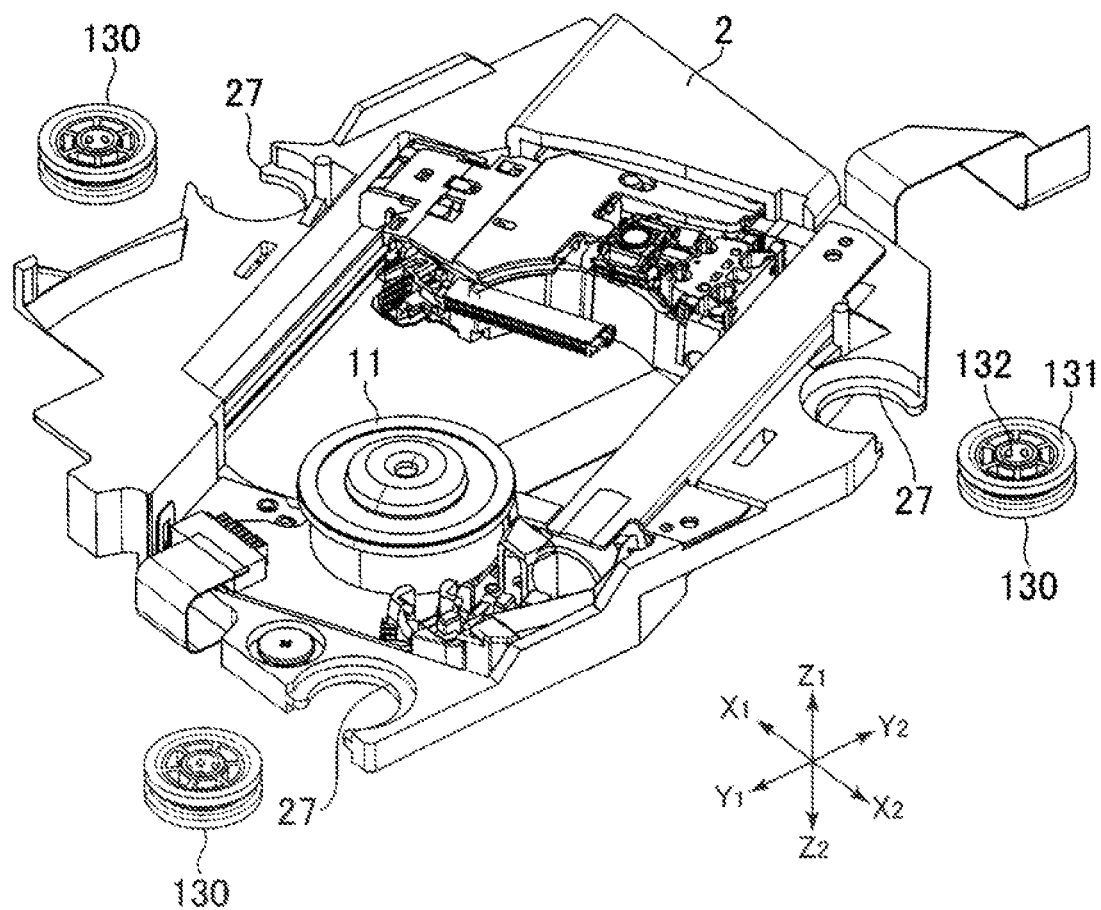
FIG. 15 is an exploded perspective view of the base frame.
Figure 16A:
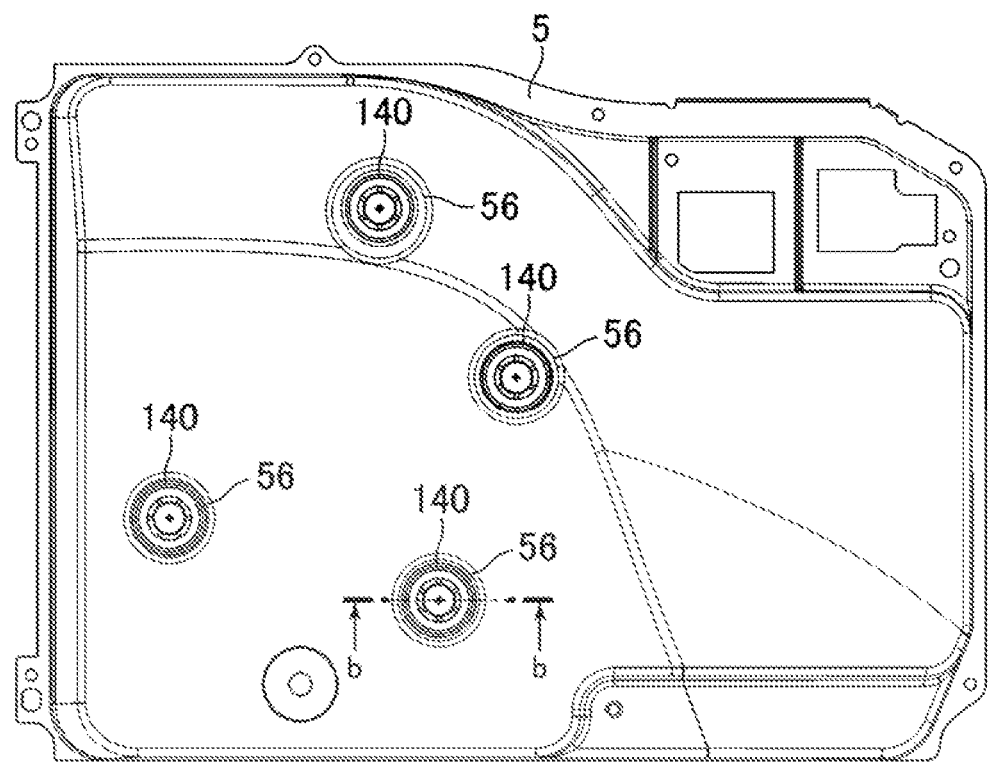
FIG. 16A is a bottom view of a bottom case.

Finally, the vibration suppression mechanism D will be described. FIG. 15 is an exploded perspective view of the base frame 2. FIG. 16A is a bottom view of the bottom case 5 constituting the outer case. As depicted in FIGS. 15 and 16A, the vibration suppression mechanism D is implemented by a plurality of (three in the present embodiment) first dampers 130 and a plurality of (four in the present embodiment) second dampers 140. The first and second dampers 130 and 140 include an elastic body such as rubber.

As depicted in FIG. 15, the first damper 130 has a dual structure including an outer tubular portion 131 shaped like a cylinder and an inner tubular portion 132 that is shaped like a cylinder and that has a diameter smaller than that of the outer tubular portion 131. The inner tubular portion 132 is disposed at the central position of the inside of the outer tubular portion 131. A plurality of (six in the present embodiment) spoke portions are formed between the outer tubular portion 131 and the inner tubular portion 132. The spoke portions are disposed at regular intervals along diameters of the outer edge portion 131 to connect the outer tubular portion 131 and the inner tubular portion 132. The spoke portions are elastically bent between the outer tubular portion 131 and the inner tubular portion 132 to absorb vibration, thus allowing vibration to be restrained from being transmitted between a member attached to the outer tubular portion 131 and a member attached to the inner tubular portion 132.

As described above, the base frame 2 includes the spindle motor 11 and the optical element corresponding to the optical pickup. The base frame 2 is housed in the inner case including the bottom frame 3 and the top frame 4. The bottom frame 3 is shaped like a box that is open upward, and supports the conveying roller 20 used as the conveying mechanism A. The base frame 2 is disposed in the bottom frame 3. In this regard, the base frame 2 is fixed in the inner case (the bottom frame 3 and the top frame 4) via the first damper 130. In the present embodiment, the base frame 2 is fixed to the bottom frame 3 via the first damper 130.

Further, the inner case (the bottom frame 3 and the top frame 4) is fixed, via the second damper 140, in an outer case (the bottom case 5 and the cover 6) housing the inner case. As described above, the bottom case 5 is shaped like a box that is open upward similarly to the bottom frame 3, and the inner case (the bottom frame 3 and the top frame 4) is fixed to the bottom case 5. In the present embodiment, the bottom frame 3 is fixed to the bottom case 5 via the second damper 140.

In many cases, the center of gravity of the optical disc is slightly misaligned with the central position of the optical disc. Thus, when the spindle motor 11 rotates the optical disc, the base frame 2 including the spindle motor 11 vibrates. In this regard, the first dampers 130 and the second dampers 140 are respectively provided in the inner case and in the outer case, allowing vibration of the base frame 2 to be restrained from being transmitted to the outer case, effectively preventing vibration from being transmitted to other components disposed outside.

As depicted in FIG. 15, a plurality of the first dampers 130 are fitted into a plurality of first-damper-attached portions 27 that are formed in the outer circumferential portion of the base frame 2 and that each have a shape corresponding to the shape of an outer circumferential portion of the first damper 130. In this regard, the first-damper-attached portion 27 is an arcuate cutout formed in the base frame 2 and has a size enough to enclose half or more of the outer circumferential portion of the first damper 130. The first dampers 130 are attached to the cutouts in the outer circumferential portion of the base frame 2 as described above, thus eliminating the need to provide arrangement spaces for the first dampers 130 inside the base frame 2. This allows an increased size of the base frame 2 to be avoided.

Figure 2C:
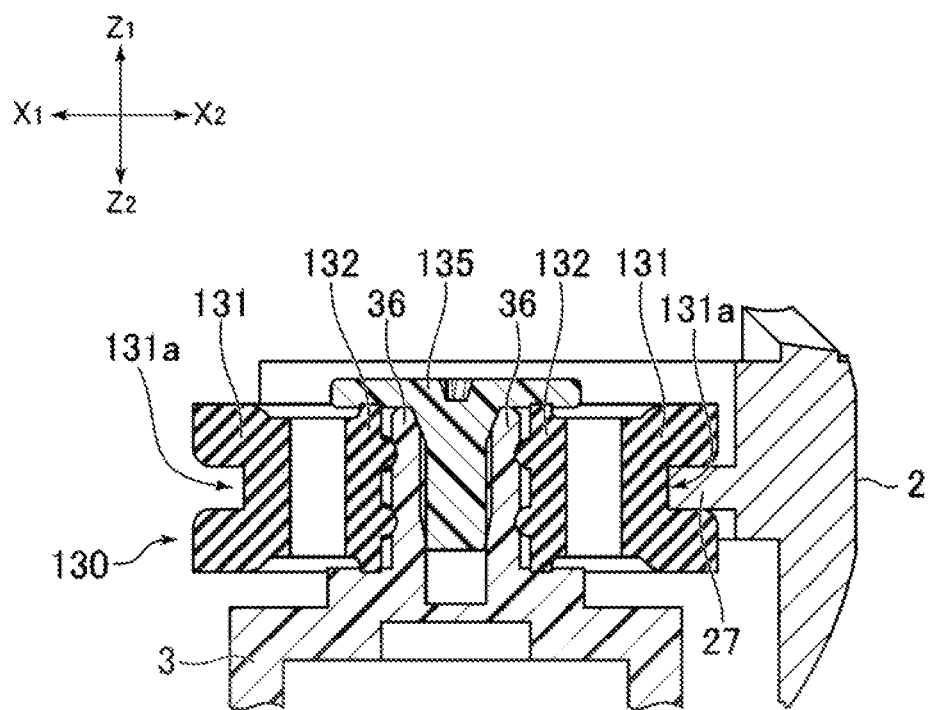
FIG. 2C is a cross-sectional view taken along a line c-c depicted in FIG. 2A.

FIG. 2C is a cross-sectional view taken along a line c-c in FIG. 2A. As depicted in FIG. 2C, the first damper 130 includes a groove portion 131a provided in an outer surface of the outer tubular portion 131 along a circumferential direction, and the first-damper-attached portion 27 of the base frame 2 is fitted inside the groove portion 131a. The groove portion 131a is provided in a portion that contacts the first-damper-attached portion 27, that is, in half or more of the outer circumferential portion of the first damper 130. Further, the bottom frame 3 includes a first protruding portion 36 (see FIG. 1) protruding upward from the bottom frame 3. The first protruding portion 36 is fixed to the first damper 130 by being inserted through the inside of the inner tubular portion 132 of the first damper 130. The first protruding portion 36 is shaped like a tube with an opening at an upper end of the tube, and includes a rivet 135 inserted inside the opening. This allows the first damper 130 to be restrained from coming off from the first protruding portion 36 of the bottom frame 3. Further, since the first protruding portion 36 includes the opening at the upper end thereof, the rivet 135 can be inserted from above the bottom frame 3.

As described above, the first damper 130 is attached to the base frame 2 in the lateral direction or/and the front-back direction (planar direction), whereas the first damper 130 is attached to the bottom frame 3 in the up-down direction (vertical direction). The first damper 130 is attached in such a manner as to be elastically deformable in the planar direction with respect to the base frame 2, while the first damper 130 is attached in such a manner as to be elastically deformable in the vertical direction with respect to the bottom frame 3. This allows vibration of the base frame 2 to be restrained from being transmitted to the bottom frame 3 constituting the inner case.

As depicted in FIG. 1, the bottom case 5 includes a plurality of second-damper-attached portions 56 to which a plurality of the second dampers 140 are attached. In the present embodiment, the second-damper-attached portion 56 is formed as a circular hole portion and disposed inside a circular depression recessed upward toward the bottom frame 3. As described above, by the second-damper-attached portion 56 being formed inside the depression in the bottom case 5, the second damper 140 can be restrained from protruding downward from the bottom case 5.

Figure 16B:
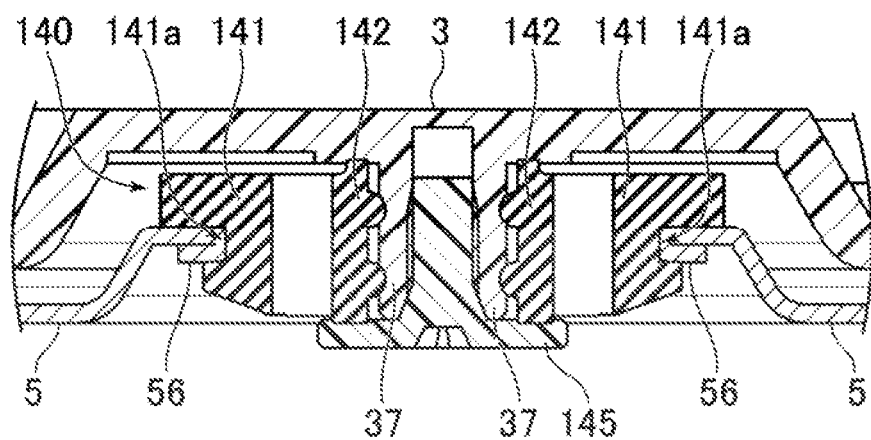
FIG. 16B is a cross-sectional view taken along a line b-b depicted in FIG. 16A.

FIG. 16B is cross-sectional view taken along a line b-b in FIG. 16A. As depicted in FIG. 16B, the second damper 140 includes a groove portion 141*a* provided in an outer surface of an outer tubular portion 141 along the circumferential direction, and an edge of the hole portion corresponding to the second-damper-attached portion 56 of the bottom case 5 is fitted inside the groove portion 141*a*. Further, the diameter of a part of the outer tubular portion 141 below the groove portion 141*a* is smaller than the diameter of a part of the outer tubular portion 141 above the groove portion 141*a*, and an outer edge of a lower end of the outer tubular portion 141 is inclined upward. The shape of the outer tubular portion 141 enables the second damper 140 to be pushed, from above, inside the hole portion corresponding to the second-damper-attached portion 56 of the bottom case 5.

Further, as depicted in FIG. 16B, the bottom frame 3 includes a second protruding portion 37 protruding downward from the bottom frame 3. The second protruding portion 37 is fixed to the second damper 140 by being inserted through the inside of an inner tubular portion 142 of the second damper 140. The second protruding portion 37 is shaped like a tube with an opening at a lower end of the tube, and includes a rivet 145 inserted inside the opening. This allows the second damper 140 to be restrained from coming off from the second protruding portion 37 of the bottom frame 3. Further, since the second protruding portion 37 includes the opening at the lower end thereof, the rivet 145 can be inserted from below the bottom frame 3 and the bottom case 5.

As described above, the second damper 140 is attached to the bottom case 5 in the lateral direction or/and the front-back direction (planar direction), whereas the second damper 140 is attached to the bottom frame 3 in the up-down direction (vertical direction). The second damper 140 is attached in such a manner as to be elastically deformable in the planar direction with respect to the bottom case 5, while the second damper 140 is attached in such a manner as to be elastically deformable in the vertical direction with respect to the bottom frame 3. This allows vibration of the inner case including the bottom frame 3 to be restrained from being transmitted to the bottom case 5 constituting the outer case. As described above, the first dampers 130 and the second dampers 140 are respectively provided on the inner side and the outer side of the bottom frame 3, thus allowing vibration of the base frame 2 to be effectively prevented from being transmitted to the bottom case 5.

7. Effects

As described above, the optical disc drive 1 includes the gear 61*c* used as the distribution mechanism that engages with each of the gears 61*a* to 61*e* and each of the gears 61*a* to 61*c*, 61*f*, and 61*g*. The gears 61*a* to 61*e* are used as the first transmission mechanism that transmit the rotation of the loading motor 60 to the conveying roller 20. The gears 61*a* to 61*c*, 61*f*, and 61*g* are used as the second transmission mechanism that transmit the rotation of the loading motor 60 to the slider 70 used as the conveying roller operation member. The distribution mechanism distributes the rotation of the loading motor 60 to the first transmission mechanism and the second transmission mechanism. The present embodiment provided with the distribution mechanism that distributes the rotation of the loading motor 60 to the two mechanisms as described above can suppress an increased length of the transmission path for the rotation of the loading motor 60, enabling torque loss caused during the process of transmission of the rotation to be reduced, compared to, for example, a case in which independent paths are provided for the first transmission mechanism that transmits the rotation of the loading motor 60 to the conveying roller 20 and the second transmission mechanism that transmits the rotation of the loading motor 60 to the conveying roller operation member (slider 70).

Further, the conveying roller 20 includes the left roller 21L and the right roller 21R, and the first end portion corresponding to one of the left end portion of the left roller 21L and the right end portion of the right roller 21R can move in the up-down direction with respect to the second end portion corresponding to the other end portion, with the relative position between the axis CL and the axis CR unchanged. Thus, even in a case where the position of the optical disc inserted into the insertion port of the optical disc drive 1 is misaligned in the lateral direction, the left end portion of the left roller 21L or the right end portion of the right roller 21R moves in the up-down direction, allowing the contact between the optical disc and the left and right rollers 21L and 21R to be maintained. Further, compared to, for example, a conveying roller in which the left roller 21L and the right roller 21R move independently, the conveying roller 20 has a simple structure, enabling the number of components of the optical disc drive 1 to be reduced.

Further, the switch arm 80 used as the bias member constituting the centering mechanism B uses the contact portions 82*a* and 82*b* formed on the switch arm 80, to push, toward the stopper portions 26*a* and 26*b*, the optical disc having reached the position of the spindle motor 11. Thus, the central position of the optical disc can be aligned with the position (drive position) of the rotational center axis of the spindle motor 11. Further, one switch arm 80 including the contact portions 82*a* and 82*b* suffices. Thus, compared to, for example, a case in which a plurality of bias members are used to push the optical disc, the present embodiment enables the number of components of the optical disc drive 1 to be reduced.

Further, the rotary arm 90 is a movable member moved in response to a collision with the optical disc that approaches the position of the spindle motor 11, and constitutes the conveying roller position manipulation mechanism that moves the position of the conveying roller 20 via the slider 70 and the roller bracket 50. Then, at least one of the centering mechanism B and the chucking pulley operation mechanism includes a member coupled to the rotary arm 90 used as a movable member. In the present embodiment, the centering mechanism B and the chucking pulley operation mechanism respectively include the switch arm 80 and the first check arm 110 as members coupled to the rotary arm 90. As described above, the rotary arm 90 is shared by the conveying roller position manipulation mechanism, the centering mechanism B, and the chucking pulley operation mechanism, and this configuration enables the number of components of the optical disc drive 1 to be reduced compared to a case in which the mechanisms do not share the rotary arm 90.

In addition, the base frame 2 is fixed, via the first damper 130, in the inner case including the bottom frame 3 and the top frame 4, and the inner case is fixed in the outer case including the bottom case 5 and the cover 6 and housing the inner case via the second damper 140. This allows vibration of the base frame 2 to be restrained from being transmitted to the outer case, effectively preventing vibration from being transmitted to other components disposed outside. Further, compared to a case in which the damper is formed in only one of the inner case and the outer case, the present embodiment eliminates the need for an increased size of the first or second damper 130 or 140, allowing an increased size of the optical disc drive 1 to be avoided. Further, compared to a case in which the second damper 140 is not provided in the outer case, the present embodiment enables the first damper 130 to be miniaturized, allowing for a reduction in misalignment between the base frame 2 and the conveying mechanism A supported by the bottom frame 3, when the optical disc drive 1 is placed in the vertical orientation (when the optical disc drive 1 is placed such that one of the left side surface and the right side surface of the optical disc drive 1 is disposed above the other).

8. Modified Example

The present invention is not limited to the optical disc drive 1 described above, and various modifications may be made to the present invention. For example, an aspect of the present invention may include a laterally symmetric structure with respect to the structure of the optical disc drive 1 described above. In other words, the laterally positional relation may be reversed. In this case, the "left," "right," "clockwise," and "counterclockwise" in the description can be respectively replaced with "right," "left," "counterclockwise," and "clockwise." For example, the loading motor 60, the gears 24 and 61*a* to 61*g*, the gear holder 62, and the slider 70 that are disposed inside the bottom frame 3 may be disposed on the right side of a plane extending through the rotational center axis (axis CB) of the spindle motor 11 along the front-back direction. Further, movement in the up-down direction may be restricted by the right shaft portion 52R of the roller bracket 50, whereas movement in the up-down direction may be permitted by the left shaft portion 52L of the roller bracket 50. In addition, inside the top frame 4, the switch board 15 and the first check arm may be disposed on the right side, whereas the switch arm 80 may be disposed on the left side. The contact portions 82*a* and 82*b* formed on the switch arm 80 may be disposed exclusively on the left side of the plane extending through the rotational center axis (axis CB) of the spindle motor 11 along the front-back direction.

Further, at least only one of the centering mechanism B and the chucking pulley operation mechanism may include the member coupled to the rotary arm 90 (movable member constituting the conveying roller position manipulation mechanism). This configuration also enables the number of components of the optical disc drive 1 to be reduced compared to a case in which the centering mechanism B and the chucking pulley operation mechanism do not share the rotary arm 90.

The invention claimed is:

1. An optical disc drive comprising:
    a conveying roller including a right roller portion configured to be rotatable around a first axis and a left roller portion configured to be rotatable around a second axis, the right roller portion and the left roller portion being arranged in a lateral direction;
    a conveying roller driving mechanism configured to rotate the conveying roller;
    a bracket supporting the right roller portion and the left roller portion; and
    a frame supporting the bracket, wherein
    the bracket has a first shaft portion provided on one side of the right side and left side of the bracket, and a second shaft portion provided on another side,
    the bracket is rotatable around a third axis defined by the first shaft portion and the second shaft portion,
    the frame is formed to allow an up-down movement of the first shaft portion of the bracket, and
    a first end portion corresponding to one of a right end portion of the right roller portion and a left end portion of the left roller portion, located on the one side of the right side and left side of the bracket, is configured to be movable in an up-down direction corresponding to the up-down movement relative to a second end portion corresponding to the other of the right end portion of the right roller portion and the left end portion of the left roller portion, with a relative orientation between the first axis and the second axis being unchanged by the up-down movement.

2. The optical disc drive according to claim 1, wherein the right roller portion and the left roller portion are separately formed members and are coupled to each other.

3. The optical disc drive according to claim 1, wherein the conveying roller driving mechanism is coupled to the second end portion of the right end portion of the right roller portion and the left end portion of the left roller portion.

4. The optical disc drive according to claim 1, wherein the relative orientation remaining unchanged on the first axis and on the second axis includes that a point of intersection of the first axis and the second axis remains unchanged by the up-down movement.

5. The optical disc drive according to claim 1, wherein the frame is formed to restrict the up-down movement of the second shaft portion of the bracket.

6. The optical disc drive according to claim 1, wherein a gap is formed in the frame to allow the up-down movement of the first shaft portion of the bracket.

7. An electronic apparatus, comprising:
    a cabinet configured to house an optical disc drive including
    a conveying roller including a right roller portion configured to be rotatable around a first axis and a left roller portion configured to be rotatable around a second axis, the right roller portion and the left roller portion being arranged in a lateral direction;
    a conveying roller driving mechanism configured to rotate the conveying roller;
    a bracket supporting the right roller portion and the left roller portion; and
    a frame supporting the bracket, wherein the bracket has a first shaft portion provided on one side of the right side and left side of the bracket, and a second shaft portion provided on another side, the bracket is rotatable around a third axis defined by the first shaft portion and the second shaft portion, the frame is formed to allow an up-down movement of the first shaft portion of the bracket, and a first end portion corresponding to one of a right end portion of the right roller portion and a left end portion of the left roller portion, located on the one side of the right side and left side of the bracket, is configured to be movable in an up-down direction corresponding to the up-down movement relative to a second end portion corresponding to the other of the right end portion of the right roller portion and the left end portion of the left roller portion, with a relative orientation between the first axis and the second axis being unchanged by the up-down movement.

* * * * *